United States Patent
Scifo et al.

(10) Patent No.: US 8,269,111 B2
(45) Date of Patent: Sep. 18, 2012

(54) SCRUNCH-IT EARPIECE/WIRE ORGANIZER AND METHOD OF USING SAME

(76) Inventors: George Scifo, Sayreville, NJ (US); Karen Ann Scifo, Sayreville, NJ (US)

( * ) Notice: Subject to any disclaimer, the term of this patent is extended or adjusted under 35 U.S.C. 154(b) by 449 days.

(21) Appl. No.: 11/820,583

(22) Filed: Jun. 19, 2007

(65) Prior Publication Data

US 2009/0303667 A1 Dec. 10, 2009

Related U.S. Application Data

(63) Continuation-in-part of application No. 11/784,387, filed on Apr. 7, 2007.

(60) Provisional application No. 60/854,208, filed on Oct. 25, 2006.

(51) Int. Cl.
*H01B 7/00* (2006.01)
(52) U.S. Cl. ........................................ 174/135
(58) Field of Classification Search .......... 174/36, 174/110 R, 112, 113 R, 115, DIG. 11
See application file for complete search history.

(56) References Cited

U.S. PATENT DOCUMENTS

| | | | | |
|---|---|---|---|---|
| 2,585,054 A | * | 2/1952 | Stachura | 174/36 |
| 3,441,951 A | * | 4/1969 | Lee | 24/31 V |
| 4,588,868 A | * | 5/1986 | Bertagna et al. | 381/382 |
| 4,802,638 A | | 2/1989 | Burger et al. | 242/85.1 |
| 5,391,838 A | | 2/1995 | Plummer, III | 174/36 |
| 5,906,507 A | * | 5/1999 | Howard | 439/501 |
| 5,949,026 A | * | 9/1999 | DeFlorio | 174/117 R |
| 5,958,315 A | | 9/1999 | Fatato et al. | 264/46.6 |
| 6,374,126 B1 | | 4/2002 | MacDonald, Jr. et al. | 455/569 |
| 6,480,611 B2 | * | 11/2002 | Hashimoto et al. | 381/371 |
| 6,826,782 B2 | * | 12/2004 | Jordan | 2/94 |
| 6,909,050 B1 | | 6/2005 | Bradford | 174/110 |
| 7,077,693 B1 | | 7/2006 | Symons | 439/501 |
| 7,498,510 B2 | * | 3/2009 | Chen et al. | 174/36 |
| 2005/0069147 A1 | * | 3/2005 | Pedersen | 381/74 |
| 2005/0098594 A1 | * | 5/2005 | Truong | 224/275 |
| 2005/0123164 A1 | | 6/2005 | Yao et al. | 381/380 |
| 2006/0166720 A1 | * | 7/2006 | Dixon | 455/575.6 |
| 2006/0185873 A1 | * | 8/2006 | Johnson | 174/36 |

FOREIGN PATENT DOCUMENTS

| | | | |
|---|---|---|---|
| CN | 1 509 062 A | * | 2/2005 |
| EP | 1509062 | | 2/2005 |
| JP | 7211146 | | 8/1995 |
| JP | 10308992 | | 11/1998 |
| JP | 2004/056636 | | 2/2004 |

* cited by examiner

*Primary Examiner* — William Mayo, III
(74) *Attorney, Agent, or Firm* — Ernest D. Buff; Ernest D. Buff & Assoc, LLC.; Margaret A. LaCroix, Esq.

(57) ABSTRACT

An earpiece/wire organizer houses and maintains wires in an untangled manner. The earpiece/wire organizer has a sleeve constructed with mating spine pieces having an interlocking self-adhering surface coat thereon, wherein the sleeve houses wires therein. Simply scrunching or compressing the sleeve with a single hand motion engages the interlocking self-adhering surface of the mating spine pieces in an attached configuration and compresses the sleeve and wire housed therein. When the user desires to lengthen or elongate the wire, the user simply pulls or elongates the sleeve with a single hand motion that disengages the interlocking self-adhering surface of the mating spine pieces and lengthens the sleeve and wire housed therein. Where more than one sleeve is provided, the sleeves are further constructed to releasably connect to one another.

21 Claims, 17 Drawing Sheets

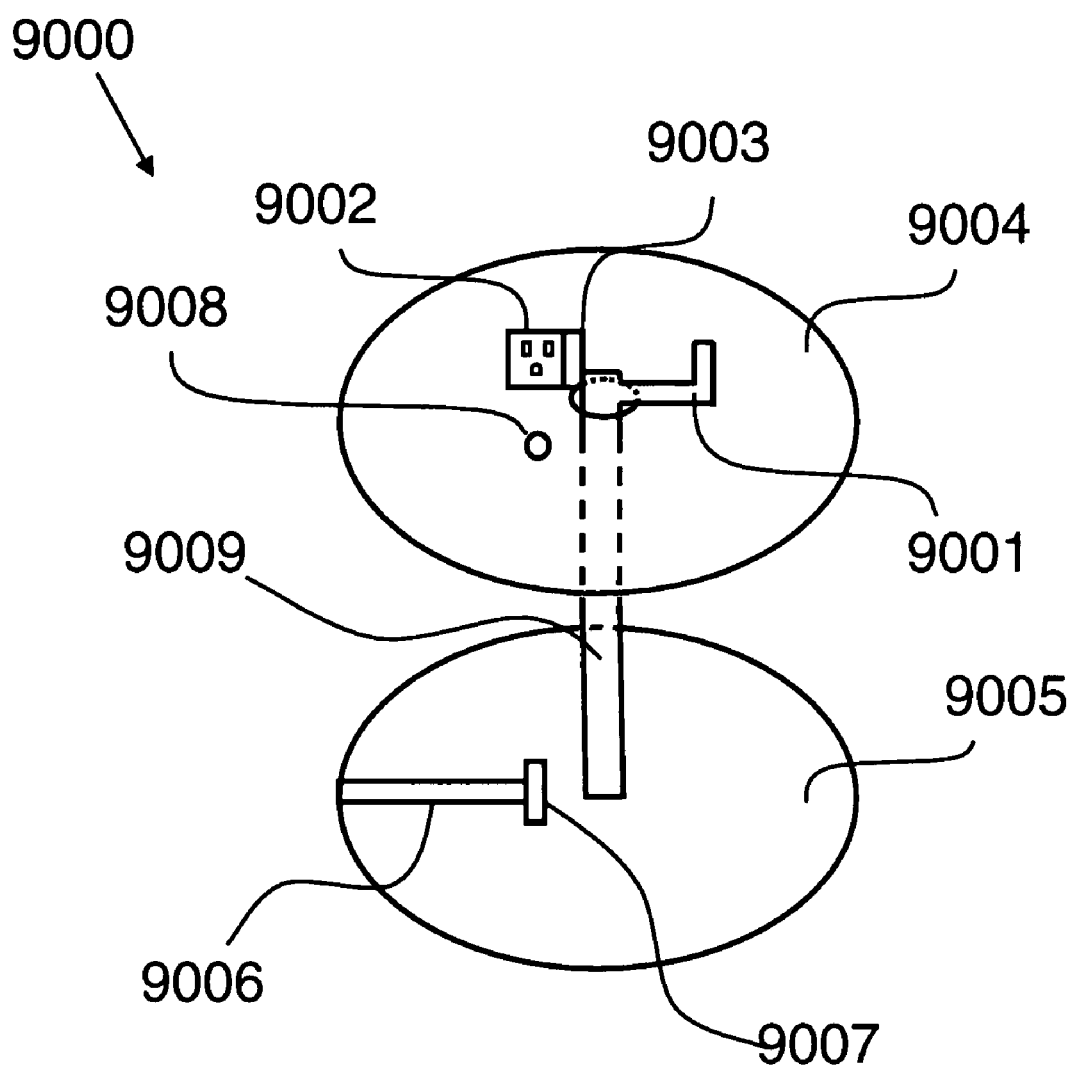

SCRUNCH-IT EARPIECE/WIRE ORGANIZER AND METHOD OF USING SAME

CROSS-REFERENCE TO RELATED APPLICATIONS

This application is a continuation-in-part of U.S. patent application Ser. No. 11/784,387, filed Apr. 7, 2007, and further claims the benefit of U.S. Provisional Patent Application Ser. No. 60/854,208, filed Oct. 25, 2006, each of which application is hereby incorporated herein in its entirety by reference thereto.

BACKGROUND OF THE INVENTION

1. Field of the Invention

The present invention relates to an earpiece/wire organizer and method for using same to house and maintain wires in an untangled manner; and more particularly, to a wire organizer that provides a sleeve constructed with a plurality of mating spine pieces coated with an interlocking self-adhering surface appointed to releasably engage with itself.

2. Description of the Prior Art

Typical earphone or headset constructions comprise a main audio wire which is adapted to connect to a jack integrated within an electronic, audio or optical device. In one form of these organizers, left and right wires connect with the main audio wire to form a "Y"-type construct which delivers audio from an electronic device such as a music device, mp3 player, and/or cellular phone. The left and right wires, or upper legs of the Y, are associated with left and right ear buds which, when worn, allow the user to hear music or sound transmitted from the electronic device. Other earphone or headphone devices involve a single wire attached to a first ear bud and a second ear bud. A microphone jack may additionally be included to transmit audio from the user to the electronic device, and to another user's electronic device; such wiring arrangements are used in the mobile phone industry.

In practice, headphone wires are stored in a pocketbook, gym bag, pocket or the like. Unfortunately, the wires forming the headphones tend to tangle and knot making it difficult to quickly connect and use the ear piece with the electronic device or transmission device. This entanglement can be very annoying. Oftentimes untangling of the wires can be difficult and time consuming. Even still, frequent entanglement and untangling can cause eventual damage to the left and right wires, impacting sound quality.

Various devices are currently provided for organizing wires. However, none of the devices provide the ability to compress and elongate the wires in a manner which maintains severability of the wires and prevents entanglement thereof.

Several of the wire organizer devices heretofore disclosed and utilized involve coverings or jackets constructed with a unilateral elongated body having edges appointed with engageable zipper elements. Exemplary of these types of jacket coverings, are the following patents. U.S. Pat. No. 2,585,054 to Stachura discloses a flexible sheet of electrically conductive material having meeting but separable closure edges with engageable tooth and groove zipper elements adapted to encircle a conductor; and U.S. Pat. No. 5,391,838 to Plummer discloses a rectangular casing with inner and outer surfaces and edges having a conventional zipper provided there along so that the casing may be closed to form a removable tube around conductors to be shielded. These devices are generally separate from the wires and merely operate to wrap around or encase the wires in order to neatly store same when the zipper elements on the edges of the elongated body are engaged. Organization of the wires by application of these jacket-like devices results from bundling within the jacket covering; the wires themselves are not provided with integrated organization means. The wires located within the jacket are not maintained in a separate yet joined manner. Consequently, they may be subject to tangling within the jacket. When the jacket is removed, the wires must be untangled from one another.

Other wire organizers involving zip-up devices are generally constructed with zip-up mechanisms integrated along bodies of wires operable to releasably join the wires upon engagement of a zipper or sliding element. For example: U.S. Pat. No. 5,949,026 to DeFlorio discloses a pair of tangle resistant electrical test leads attached to a nonconductive slide fastener, such as a nylon zipper, that co-joins cords by engaging the slide fastener or zipper; U.S. Pat. No. 6,909,050 to Bradford discloses an electrical cable system including a first electrical cable and a second electrical cable constructed to releasably join to form a co-joined cable by strip and groove mating; U.S. Patent Application Publication No. 2005/0069147 to Pedersen discloses a headset wire for a portable electronic device including a zipper used to releasably join or separate pairs of wires; Foreign Patent Publication No. EP 1509062 to Fung et al. discloses a headphone apparatus appointed with a zipper slider for sliding along cords of the headphone and thereby joining or disjoining two cords; Foreign Patent Publication No. JP 07211146 to Tateno discloses a stereophonic earphone cable having a fastener on a side of each the left and right earphone cables and a chuck or slider to co-join the cables; and Foreign Patent Publication No. JP 2004056636 to Kihachiro discloses a headphone apparatus integrated with a slider type fastener over substantially the entire length of each cable so that each branch cable can be co-joined.

These integrated zip-up devices, as well as aforediscussed jacket constructs, fail to provide a sleeve surface that enables scrunching or compression and elongation or lengthening of the wires. As such, the co-joined and bundled wires cannot be compressed for enhanced compact storage. Coiling of the co-joined wires and/or jacket containing the bundled wires may be an option to achieve a more orderly neat maintenance; however, this would subject the co-joined wires and/or jacket of the bundled wires to tangling.

Another broad categorical type of apparatus for organizing wires involves devices having a member for pulling two wires together without lengthwise co-joining of the wires. For example: U.S. Pat. No. 6,374,126 to MacDonald et al. discloses a hands-free earpiece headset configured such that a second earpiece is integrally mounted and stowed against a first earpiece. The headset further includes a sliding member which is configured to slidably advance and retract about the first and second cords for organization of same. Foreign Patent Publication No. JP 10308992 to Masuda et al. discloses a device having two left headset wires that are appointed to be completely contained in a cylindrical bag which slidably engages to house the wires therein when the headset is being carried. These types of organization apparatuses fail to provide compression or elongation of the enclosed wire in an orderly, tangle free manner. The wires are not co-joined together, but are merely housed in close proximity with engagement of the slide or bag, respectively. As a result, the wires are subject to entangling with one another, especially within the bag assembly storage structure.

Various wire organizing devices involve a spool type member engageable with associated wires for stowage thereof. For example: U.S. Pat. No. 4,802,638 to Burger et al. discloses a cord stowage device that includes a spool having opposed ends with cup-shaped members and a channel through which a cable slidably passes, cavities shaped to receive earphones therein for storage are also provided on the outside of the cup-shaped members; U.S. Pat. No. 7,077,693 to Symons discloses a cable management device having a body with an axis and at least one planar flange and cable retainer for allowing removable attachment of a cable during axial winding in a single plane via a spool; and U.S. Patent Application Publication No. 2005/0123164 to Yao et al. discloses a mobile device cord holder constructed with retaining regions defining a cord holding area appointed to hold a cord in a non-tangling manner as the wire is wrapped or spooled around the cord holding area. Wires associated with these spool type devices do not engage with one another to form a single/co-joined wire. Nor do these spool type devices provide the functionality of compressing or elongating the wires. Instead the wires are merely spooled within the device for storage. As the wires wrap around the spool, the wires are prone to tangling.

Notwithstanding the efforts of prior art workers to construct an earpiece or wire organizer that prevents or mitigates entanglement of wires during storage and carrying, there remains a need in the art for an earpiece or wire organizer that can be readily engaged by simply scrunching or compressing and pulling or elongating wires together with a single hand motion. Specifically, there is a need in the art for an earpiece or wire organizer that includes a sleeve appointed to house a substantial portion of a wire. Further, there is a need in the art for an earpiece or wire organizer that provides a sleeve constructed with mating spine pieces coated with an interlocking self-adhering surface that attaches to itself to releasably engage the mating spine pieces with one another in a stacked relationship. Moreover, there is a need in the art for an earpiece or wire organizer that provides a sleeve constructed with mating spine pieces coated with an interlocking self-adhering surface that attaches to itself to releasably engage the mating spine pieces, and thereby compress and elongate a wire housed within the sleeve.

SUMMARY OF THE INVENTION

The present invention relates to an earpiece/wire organizer and method for using same for housing and maintaining wires in an untangled manner. The earpiece/wire organizer provides a sleeve constructed with mating spine pieces coated with an interlocking self-adhering surface. The sleeve houses wires therein to prevent or mitigate entanglement during storage and carrying. Simply scrunching or compressing the sleeve with a single hand motion engages the interlocking self-adhering surface coating of the mating spine pieces and attaches the interlocking self-adhering surface to itself and visa vie the mating spine pieces to form an attached configuration and compresses the sleeve and wire housed therein. When the user desires to lengthen or elongate the wire, the user simply pulls or elongates the sleeve with a single hand motion that disengages the mating spine piece's interlocking self-adhering surface and lengthens the sleeve and wire housed therein. Where more than one sleeve is provided, the sleeves are further constructed to releasably attach to one another.

The earpiece/wire organizer for housing and maintaining wires in an untangled manner includes at least one flexible sleeve having a proximal end, distal end, central body, and an interior cavity. This internal cavity of the sleeve is adapted to receive and house a substantial portion of a wire therein. A plurality of mating spine pieces is arranged along the sleeve. The mating spine pieces are coated with an interlocking self-adhering surface. This interlocking self-adhering surface is preferably comprises of hook and eye fastener portions integrated together so that the interlocking self-adhering surface attaches to itself when it comes into contact with itself. The interlocking self-adhering surface is appointed to releasably engage with one another, and visa vie releasably engage the mating spine pieces with one another which in turn compresses or elongates the sleeve and the wire housed therein when a scrunching or pulling force, respectively, is administered to the sleeve.

In another embodiment, the earpiece/wire organizer for housing and maintaining wires in an untangled manner includes a first flexible sleeve. This flexible sleeve is adapted to receive and house a first wire therein. First mating spine pieces having an interlocking self-adhering surface coating are further included along the body of the first sleeve. In one further embodiment, the interlocking self-adhering surface coating of the mating spine pieces engages with itself when the sleeve is coiled upon itself to attach the mating spine pieces. Another related embodiment provides a second sleeve with second mating spine pieces also coated with the interlocking self-adhering surface, which engages with the interlocking self-adhering surface of the first mating spine pieces of the first sleeve to releasably attach the first and second sleeves together.

Another embodiment provides a wire organizer including a first sleeve. This sleeve is adapted to receive and house a first wire. The sleeve further includes at least one fastening member coated with an interlocking self-adhering surface, for attaching the sleeve to another sleeve coated with the interlocking self-adhering surface, or another fastening member/portion.

A method of using a wire organizer for housing and maintaining wires in an untangled manner is provided. The method includes a first step of placing a substantial portion of a wire within an interior cavity of a sleeve. The sleeve has a central body and proximal and distal ends, and is constructed with a plurality of mating spine pieces coated with an interlocking self-adhering surface appointed to attach to itself and cause the plurality of mating spine pieces to releasably engage with one another to compress and elongate the sleeve and the wire housed therein. Next, the method provides for attaching a top portion of the wire to the proximal end of the sleeve by way of an upper attachment means integrated within the proximal end of the sleeve. Moreover, a bottom portion of the wire is attached to the distal end of the sleeve by way of a lower wire attachment means integrated within the distal end of the sleeve. With this arrangement, the sleeve with the wire housed therein is cable of scrunching or compressing and engaging the interlocking self-adhering surface coated on the mating spine pieces to compress the wire housed therein, as when the wire is in non-use or shorter wire length is desired. When the wire is in use, or a longer wire length is desired, the wire is elongated or extended lengthwise by pulling on or elongating the sleeve and disengaging the interlocking self-adhering surface coated on the mating spine pieces to lengthen the wire housed therein.

A carrying case for an audio device and related accessories is also provided, and comprises an audio device compartment appointed for receiving and removably housing an audio or electronic device and an accessory compartment appointed to house accessories associated with said audio device. The accessory compartment is provided with a flap closure.

A carrying case for an audio device and related accessories is also provided. This carrying case comprises a case having a front, a back, and an interior cavity appointed to receive an audio device through insert slot, the back of the case has an attachment means thereon. A pouch is further provided. This pouch has a cavity for housing accessories, and has a pouch patch appointed for releasably fastening the pouch to the attachment means of the case.

Moreover, an audio wire organizer management system comprising an object having an audio device pocket appointed to receive an audio or electronic device and a fastening strip or patch is provided. The system further includes that the fastening strip or patch be appointed to releasably fasten a mating attachment surface located on an audio wire to the object, which preferably is an article of clothing.

BRIEF DESCRIPTION OF THE DRAWINGS

The invention will be more fully understood and further advantages will become apparent when reference is had to the following detailed description of the preferred embodiments of the invention and the accompanying drawings, in which:

FIG. 1b illustrates the scrunched condition of the earpiece or wire organizer shown in FIG. 1a;

FIG. 10b illustrates a back view of the case of FIG. 10a;

FIG. 14 illustrates a view of a winder for winding the first sleeve and spooling same upon itself.

DETAILED DESCRIPTION OF THE INVENTION

The present invention provides an earpiece/wire organizer and method for using same for housing and maintaining wires in an untangled, readily usable manner. The earpiece/wire organizer provides a flexible sleeve wherein a substantial portion of a wire, preferably for an audio headset device, is housed. A plurality of mating spine pieces coated with an interlocking self-adhering surface is integrated within the structure of the sleeve. The interlocking self-adhering surface on the mating spine pieces is appointed for engagement with itself in order to cause the mating spine pieces to releasably attach to one another for compression and elongation of the sleeve, as well as the wire housed therein. Advantageously, when the length of the wire is desired to be shortened, as during storage or non-use, the earpiece/wire organizer is readily and effortlessly compressed by a single hand motion to compress the wire housed therewithin. Conversely, when the length of the wire is desired to be lengthened, as during use, the earpiece/wire organizer is readily and effortlessly elongated by a single pulling hand motion to lengthen the wire housed therein. Single hand operation, while providing orderly storage, enables a user to quickly use or stow the earpiece in a safe, non-distracting manner without annoyance stemming from wire entanglement.

Figure 1A:
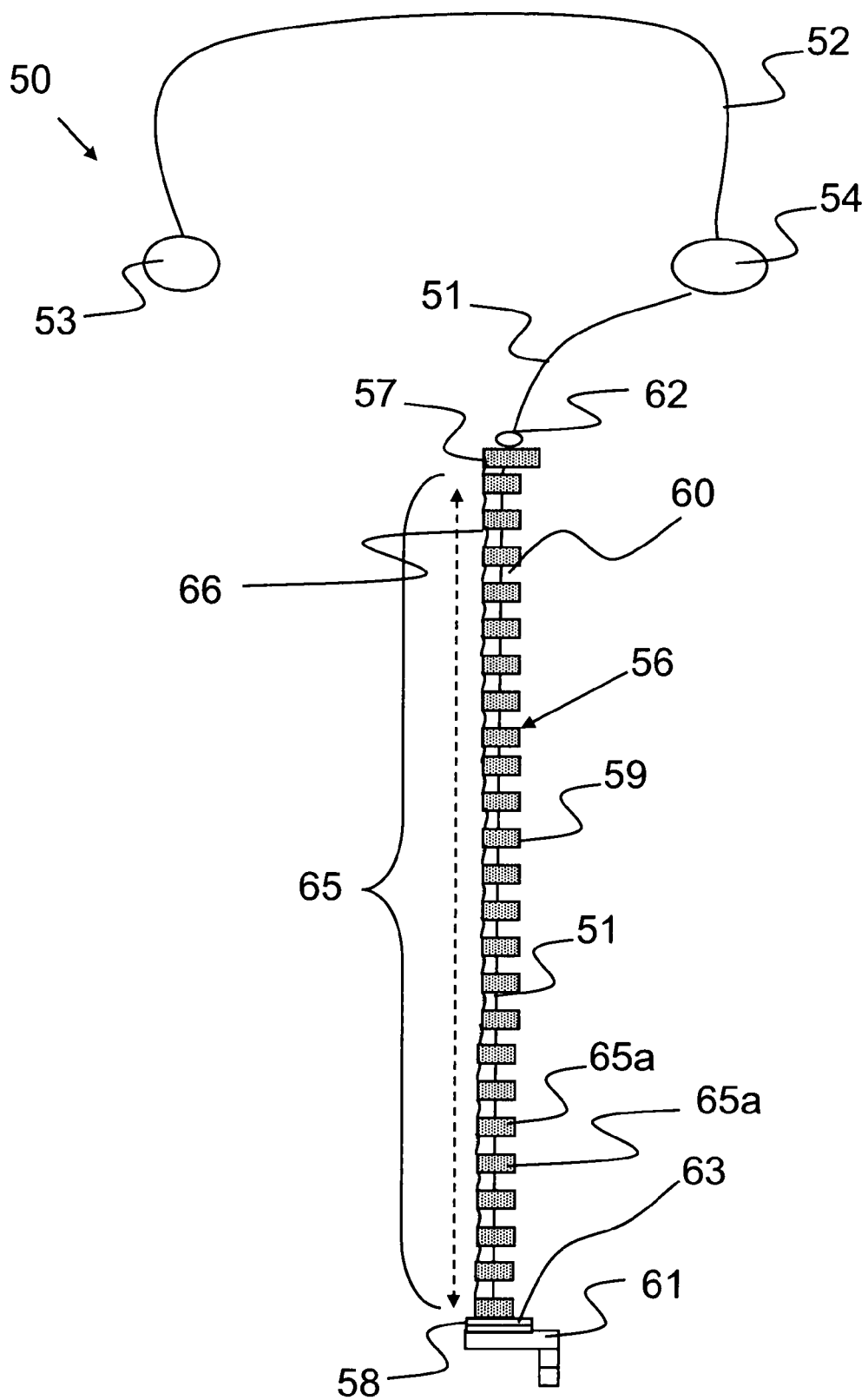
FIG. 1a illustrates a schematic view of an embodiment of the earpiece or wire organizer shown in a substantially elongated/lengthened/or extended form as when the earpiece is in the use condition, wherein the earpiece substantially includes a unilateral wire as utilized as earpieces for cellular phones or other electronic devices.
Figure 1B:
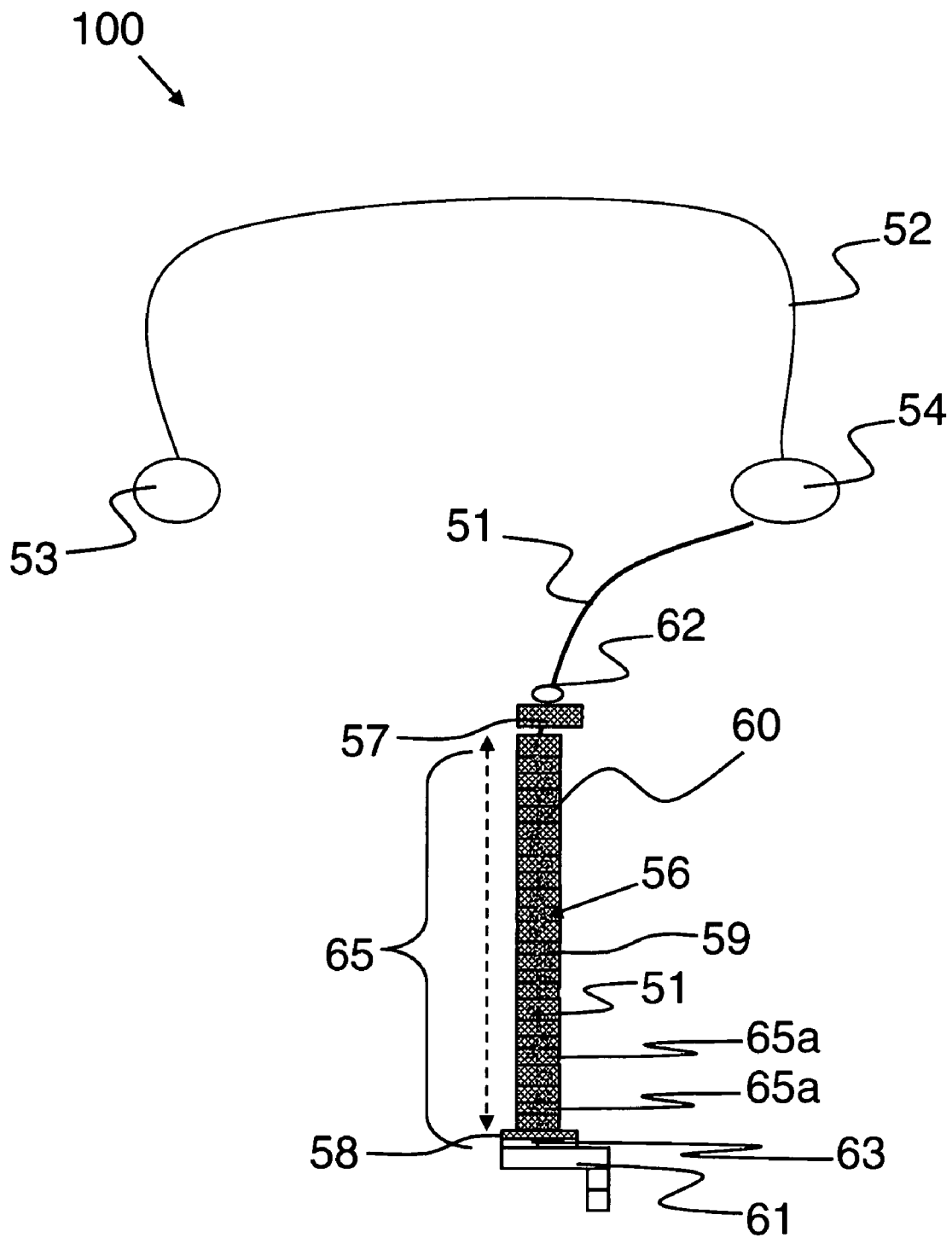

FIGS. 1a and 1b illustrate schematic views of a first embodiment of the earpiece or wire organizer wherein the earpiece substantially includes a unilateral wire of the type utilized with earpieces for cellular phones or other electronic devices. FIG. 1a shows generally at 50 a top view of the earpiece organizer in a substantially elongated/lengthened/or extended form, as when the earpiece is in the use or lengthened condition. While FIG. 1b shows generally at 100 a top view of the earpiece organizer in a substantially scrunched/compressed/or shortened form of the type extant the earpiece is in the non-use or compressed condition. In these particular figures, the wire is part of a headphone that is a unilateral type headphone set having a single unilateral audio wire 51 with ear buds 53, 54 thereon attached. Audio wire 51 has an adaptor 61 appointed to engage with an electronic device by way of the electronic device's headphone or audio jack. The headphone further includes a support wire 52 which attaches left ear bud 53 to right ear bud 54. Audio wire 51 may be part of a device selected from a group consisting of headphones, earpieces, headsets, or like devices.

Wire organizer 50, 100 includes at least one flexible sleeve 56 having a proximal end 57, distal end 58, central body 59, and an interior cavity 60. Sleeve 56 is integrated within the constructs of the audio wire 51 of the headphone/earpiece. Alternatively, sleeve 56 may be an after market attachment to the headphone device (See FIGS. 5a and 5b). Preferably, sleeve 56 is constructed as an elongated cylinder structure. Elongation of sleeve 56 is shown in FIG. 1a, while compression of sleeve 56 is shown in FIG. 1b. A plurality of mating spine pieces 65 are arranged along the length of sleeve 56. These mating spine pieces 65 are coated with an interlocking self-adhering surface 65a that releasably engages with itself, and thereby releasably engages the mating spines pieces 65 with one another to compress and elongate sleeve 56 and audio wire 51 housed therein. Preferably, mating spine pieces 65 are connected to one another by way of a flexible spine member 66 running lengthwise along sleeve 56 on the side of spine pieces 65. In this embodiment, the earpiece/wire organizer preferably involves use of interlocking surface 65a that comprises self contained hook and eye/loop fasteners so that the surface 65a interlocks or attaches with itself, such as self adhering Velcro®. The benefit of utilizing a self adhering surface as the interlocking self-adhering surface includes ready attachment of the fastener pieces without the necessity to line the pieces up. All of the mating spine pieces of the sleeve can join together at any orientation, giving the sleeve enhanced ability to be scrunched or compactly stowed.

Sleeve 56 is adapted to receive and house a substantial portion of audio wire 51 within interior cavity 60. Proximal end 57 of sleeve 56 includes an upper attachment means appointed to be attached to a top portion 62 of wire. Distal end 58 of sleeve 56 includes a lower wire attachment means appointed to be attached to a bottom portion 63 of wire 51. A substantial portion of wire 51 is housed within sleeve 56 and traverses within mating spine pieces 65 so that wire 51 is compressed and elongated when sleeve 56 is compressed (FIG. 1b) and elongated (FIG. 1a). Spine pieces 65 may be constructed having a hollow body; alternatively, spine pieces 65 may be constructed having a hollow portion, wherein the hollow portion may be appointed to accommodate a proximate segment of wire 51 when wire 51 is scrunched (See FIGS. 2a and 2b herein for a discussion on the operation of the spine pieces 65).

Figure 2A:
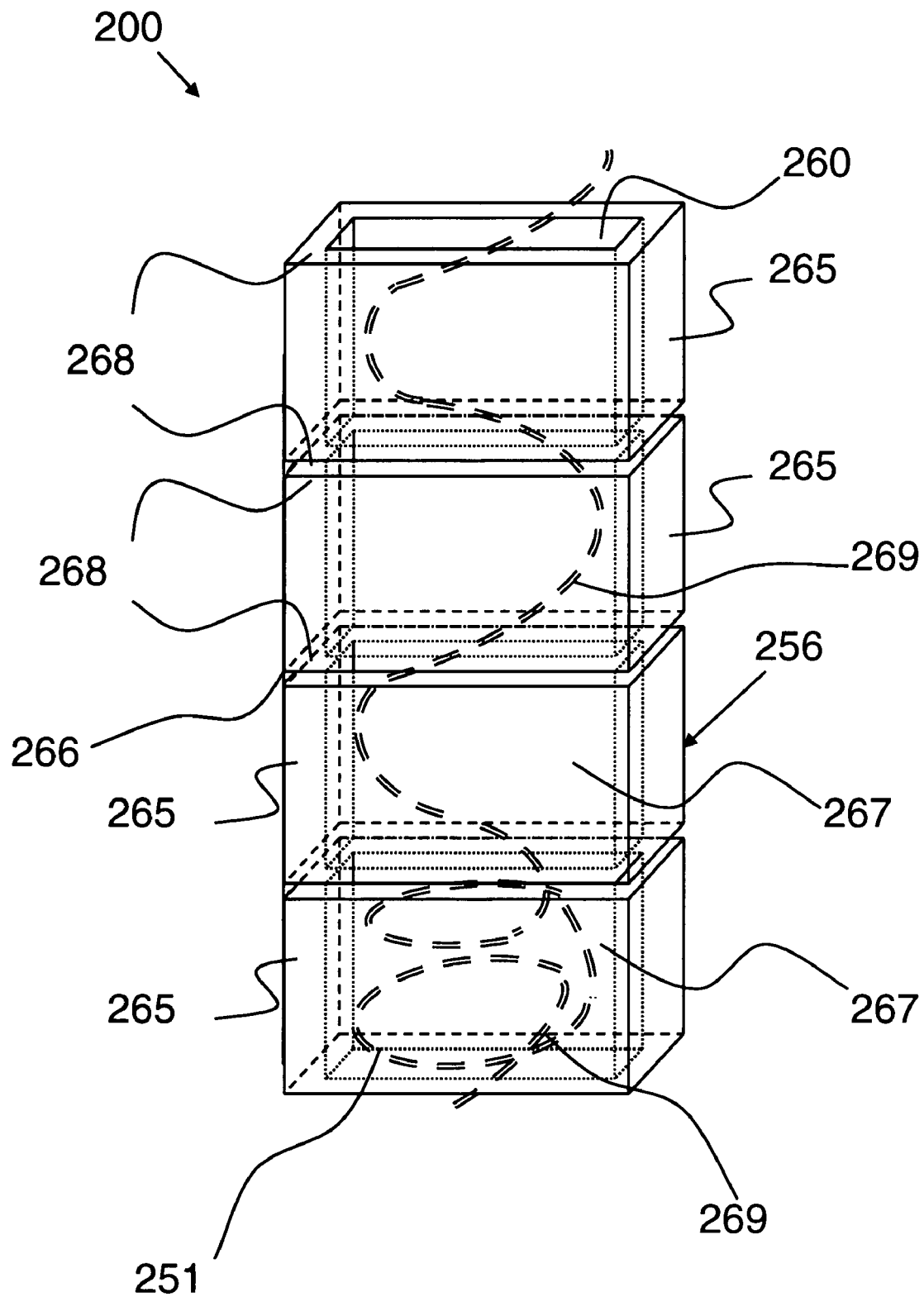
FIG. 2a is a schematic view of an embodiment of the spine pieces engaging with the wire, wherein the wire is housed therein when the sleeve of FIGS. 1a and 1b is in the scrunched or compressed configuration.
Figure 2B:
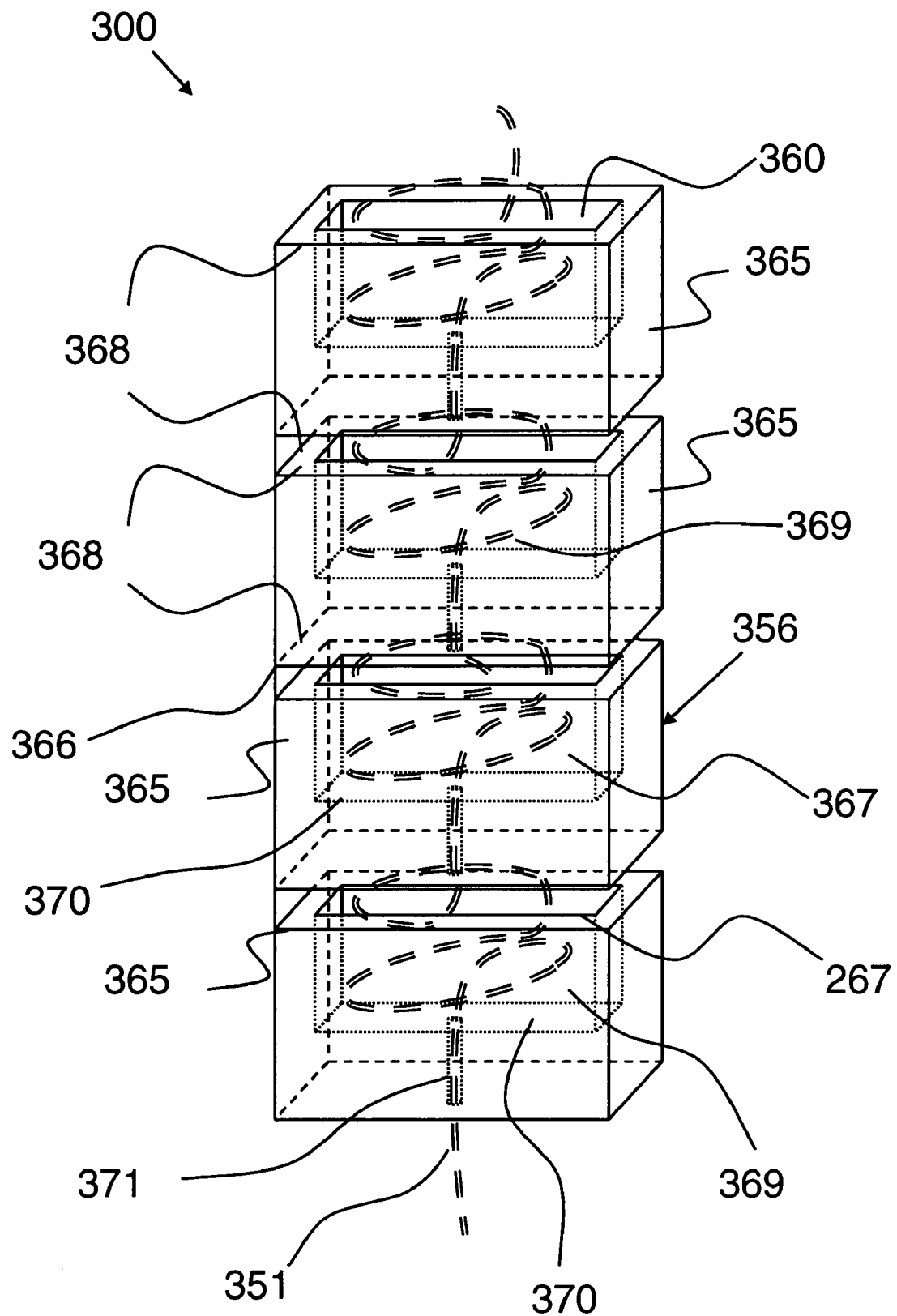
FIG. 2b a schematic view of another embodiment of the spine pieces that engage with the wire so that the wire is housed therein when the sleeve of FIGS. 1a and 1b is in the scrunched or compressed configuration.

FIGS. 2a and 2b illustrate alternative embodiments of the spine pieces; showing the spine pieces engaging with the audio wire as the sleeve is scrunched or compressed. In referring to FIG. 2a, shown generally at 200, spine pieces 265 and 265, respectively, are shown arranged on sleeve 256.

A section of an audio wire 251 traverses chambers 267 of spine pieces 265. A top portion of wire 251 (not shown) extends downwardly from and is attached to a proximal end (not shown) of sleeve 256 by way of an upper attachment means (not shown). A bottom portion of wire 251 (not shown) extends upwardly from and is attached to a distal end (not shown) of sleeve 256 by way of a lower wire attachment means. As a result wire 251 traverses interior compartment 260 of sleeve 256 and chambers 267 of mating spine pieces 265. Herein, each of the mating spine pieces 265 is shown as a square or cube-like structure having a hollow interior forming chamber 267 therein. However, each of the mating spine pieces 265 may be cylindrical in shape, or have any type of shape or form. These mating spine pieces 256 may be attached to one another by way of a flexible spine member 266 located on at least one side of spine pieces 265, or on all sides of spine pieces 265. In this embodiment, the portion of wire 251 shown located in the spine pieces 265 is not attached thereto but is attached to the proximal and distal ends of sleeve 256 so that wire 251 can hang loosely within chambers 267 of spine pieces 265.

Spine pieces 265 are coated with an interlocking self-adhering surface 268. Preferably, the interlocking self-adhering surface 268 is comprised of hook and loop/eye fastener portions so that the interlocking self-adhering surface can fasten to itself. Spine pieces 265 may be entirely coated with interlocking self-adhering surface 268. When sleeve 256 is compressed by a scrunching motion, spine pieces 265 move together and attach to one another by way of interlocking self-adhering surface 268, preferably via hook and eye attachment. For example, as surfaces 268 come into contact, the surfaces 268 releasably fasten or attach together so that the sleeve 256 becomes compressed. In turn, as wire 251 is attached to both ends, proximal and distal, of sleeve 256 and sleeve 256 become compressed; wire 251 become compressed, with slack portions 269 snaking between chambers 267 of alternating mating spine pieces 265, traversing interior compartment 260 of sleeve 256 (FIG. 1b). In turn, when sleeve 256 is pulled alternating mating spine pieces 265 surfaces 268, become disengaged and sleeve 256 is lengthened or elongated, which in turn lengthens or elongates wire 251 housed therein and fixed at proximal and distal ends of sleeve 251 (FIG. 1a).

In referring to FIG. 2b, shown generally at 300, spine pieces 365 are shown arranged on sleeve 356 having an interior compartment 360. Herein, each of the mating spine pieces 365 is shown as a square or cube like structure having a hollow chamber 367 with a chamber floor 370, appointed with a chamber aperture 371 for housing wire 351 and allowing it to pass therein. Wire 351 may be slide-ably housed within each of the chamber apertures 371 so that spine pieces 365 can slide along wire 351. Alternatively, wire 351 may be fixed within each of the chamber apertures 371 so that the spine pieces 365 can not slide along wire 351. Each of the mating spine pieces 365 may be cylindrical in shape, or have any type of shape or form. These mating spine pieces 365 may be attached to one another by way of a flexible spine member 366 located on at least one side of spine pieces 365, or on all sides of spine pieces 365. Wire 351 is attached to the proximal and distal ends of sleeve 256.

Spine pieces 365 are coated with an interlocking self-adhering surface 368. Preferably, the interlocking self-adhering surface 368 is comprised of hook and loop/eye fastener portions so that the interlocking self-adhering surface can fasten to itself. Spine pieces 365 may be may be entirely coated with interlocking self-adhering surface 368. In compression operation, as sleeve 356 is compressed by a scrunching motion, spine pieces 365 move together and interlocking self-adhering surface coating 368 attaches to itself causing spine pieces 365 to attach to one another, preferably via hook and eye attachment. For example, as interlocking self-adhering surface 368 comes into contact with local interlocking self-adhering surface 368, the interlocking self-adhering surfaces 368 releasably fasten or attach together so that the spine pieces 365 join together and sleeve 356 becomes compressed. In turn, as wire 351 is attached to both ends, proximal and distal, of sleeve 356 and sleeve 356 become compressed; wire 351 becomes compressed, with slack portions 369 snaking into chambers 367 of alternating mating spine pieces 365 (FIG. 1b). In turn, when sleeve 356 is pulled the interlocking self-adhering surface coating 368 of the spine pieces 365 become disengaged and sleeve 356 is lengthened or elongated, which in turn lengthens or elongates wire 351 housed therein and fixed at proximal and distal ends of sleeve 351 (FIG. 1a).

Figure 3:
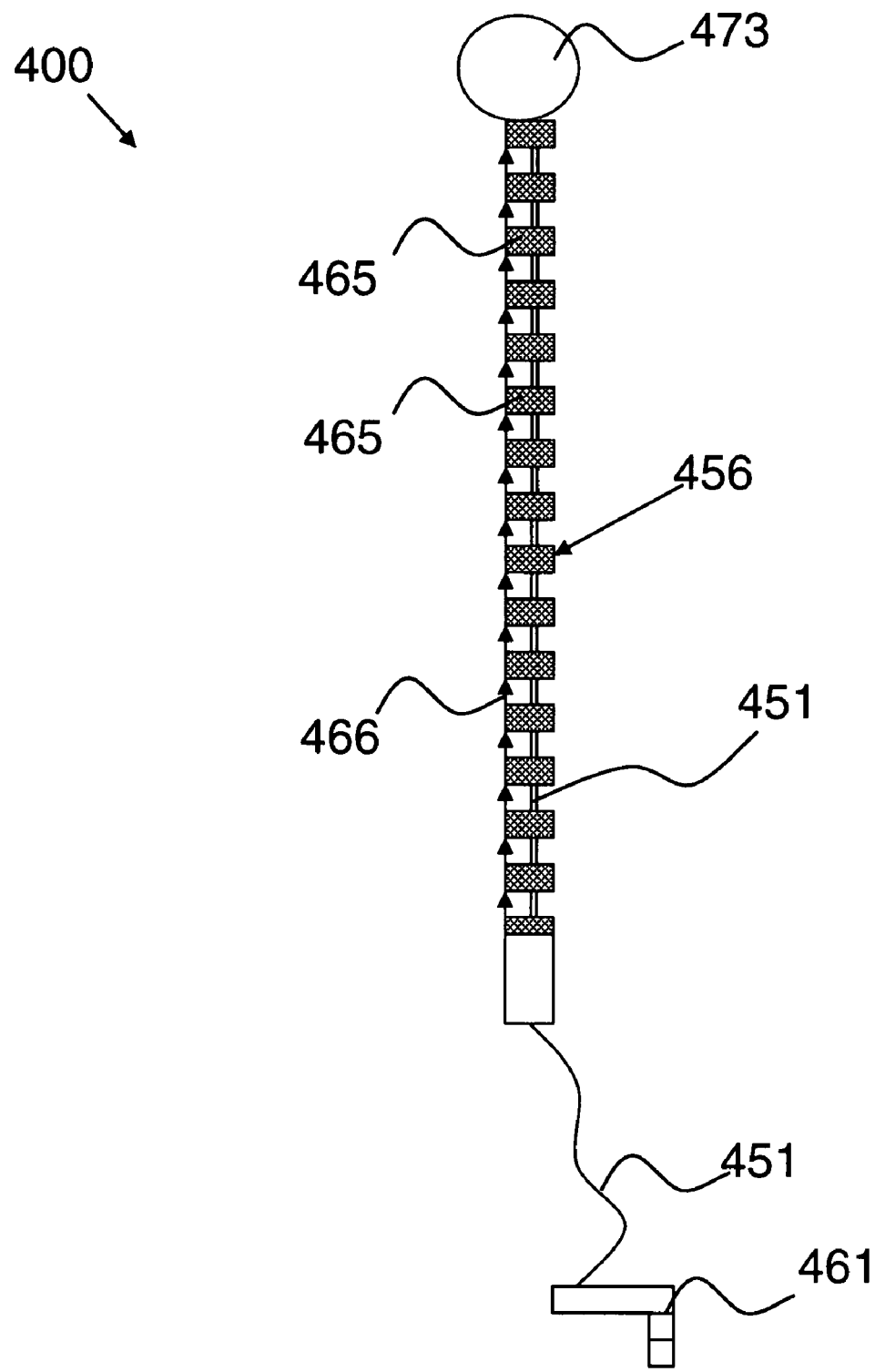
FIG. 3 is a schematic view illustrating another embodiment of the earpiece or wire organizer in a substantially elongated/lengthened/or extended form, the earpiece substantially including a unilateral wire of the type utilized with earpieces for cellular phones or other electronic devices, and the wire of the device being integrated within the sleeve.

FIG. 3 illustrates a schematic view of another embodiment of the earpiece or wire organizer shown at 400. Wire organizer 400 is shown in a substantially elongated/lengthened form, wherein the earpiece substantially includes a unilateral wire as utilized as earpieces for cellular phones or other electronic devices, and the wire of the device is integrated within the sleeve. Audio wire 451 is attached to an ear bud 473 and an adaptor 461 appointed to engage with a jack of an electronic device. A sleeve 456 is integrated within the constructs of the headphone, alternatively, sleeve 456 may be an after market attachment to the headphone device. Sleeve 456 further comprises a plurality of spine pieces 465 constructed with an interlocking self-adhering surface 467 coating thereon. Interlocking self-adhering surface 467 is preferably comprised of hook and loop/eye fastener portions integrated in the construct of the interlocking self-adhering surface 467. As the interlocking self-adhering surface 467 attaches to itself, spine pieces 465 are releasably engage with one another. A flexible spine member 466 is provided on at least one side of the sleeve 456. Spine pieces 465 are appointed to be compressed and elongated, thereby compressing sleeve 456 and wire 451 housed therein.

Figure 4:
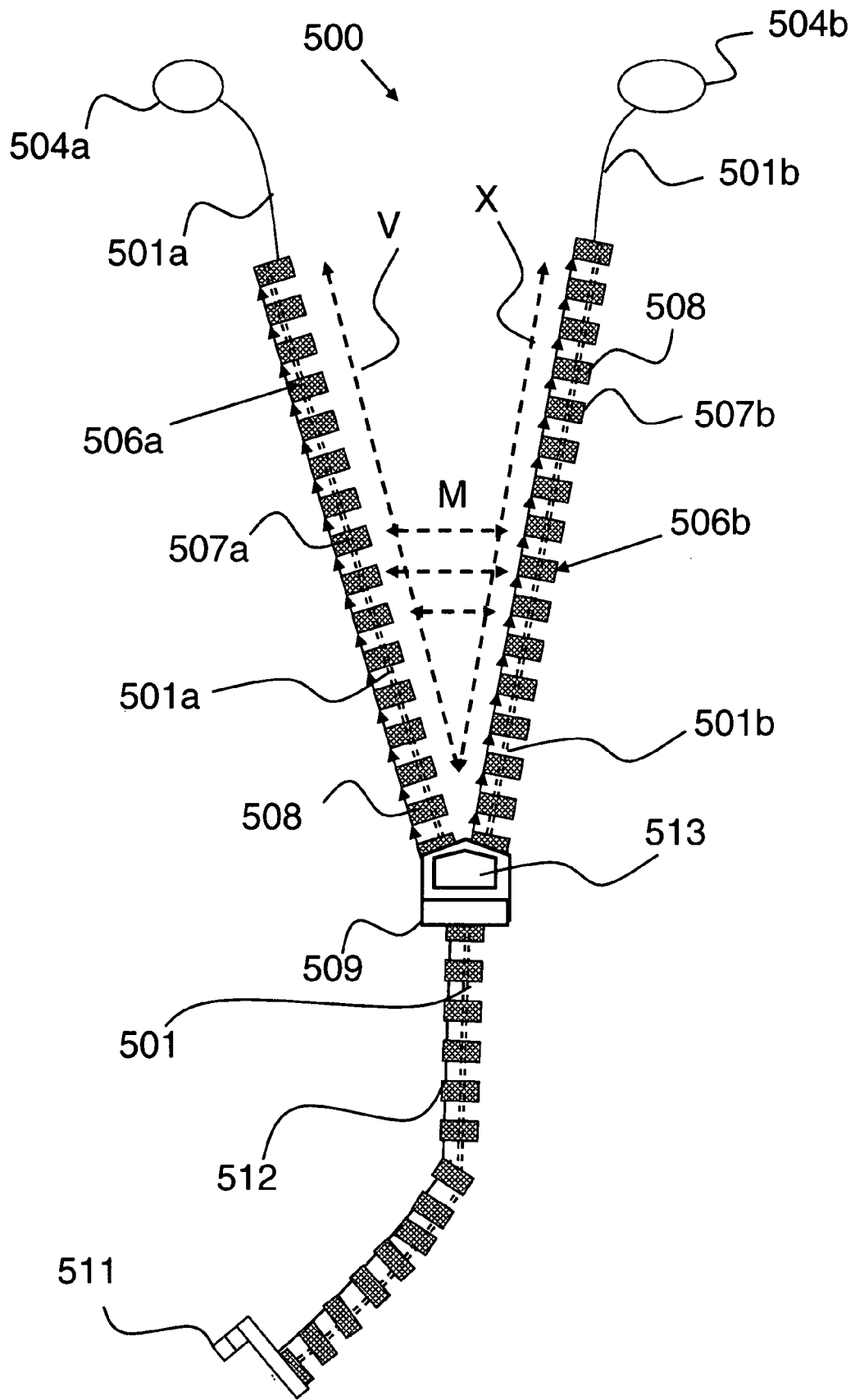
FIG. 4 illustrates a schematic view of another embodiment of the earpiece or wire organizer, wherein the headphone involves a Y-shaped construction with dual audio wires attached to ear buds.

FIG. 4 illustrates a schematic view of another embodiment of the earpiece or wire organizer, wherein the headphone involves a Y-shaped construction with dual audio wires attached to ear buds, shown generally at 500. In this embodiment, the headphone involves a Y-shaped construction with audio wires 501a and 501b attached to ear buds 504a and 504b, respectively. Audio wires 501a, 501b feed from main wire 501 at divider 509. Main wire 501 is attached to an adapter portion 511 appointed to be plugged-in to a jack of an electronic device. At least two sleeves 506a, 506b are provided for housing left and right wires 501a, 501b. Left and right sleeves 506a, 506b each comprise mating spine pieces 507a and 507b. Spine pieces 507a, 508a and 507b are constructed with an interlocking self-adhering surface 508 coating thereon. Interlocking self-adhering surface 508 preferably is comprised of hook and loop/eye fastener portions integrated in the construct of the interlocking self-adhering surface 508. As the interlocking self-adhering surface 508 attaches to itself, spine pieces 507a and 507b attach to one another so that each of left and right sleeve 506a, 506b can be compressed (V, X) and elongated, and left and right sleeves 506a, 506b can be releasably attachable to one another (M). Specifically, left wire sleeve 506a comprises a plurality of spine pieces 507 coated with the interlocking self-adhering surface 508 in a spine-like configuration arranged so that left wire sleeve 506a can be compressed or elongated as shown by way of phantom arrow V. Right wire sleeve 506b further comprises a plurality of fastener pieces 507 in a spine-like configuration arranged so that right wire sleeve 506b can be compressed or elongated as shown by way of phantom arrow X. Additionally, interlocking self-adhering surface 508 of spine pieces 507 of left and right wire sleeves 506a, 506b can engage as indicated by the phantom arrows shown at M. Between divider 509 and adapter portion 511 a base sleeve 510 with spine pieces 512 may be applied to wire 501 so that this lower wire portion may also be compressed and elongated. A slide 513 may also be provided to mechanically engage the interlocking self-adhering surface 508 of spine pieces 507; otherwise engagement of the interlocking self-adhering surface 508 of spine pieces 507 is simply accomplished manually by squeezing the wire together.

Integrated hook and eye construction of the self adhering interlocking self-adhering surface coated on the spine pieces of the wire organizer are arranged so that instead of having to zip up or otherwise manipulate the organizer to join the wire leads together, the user simply "scrunches it". The earpiece organizer has several advantages over organizers that use a zipper or otherwise more intricate engaging mechanism. The earpiece organizer has no metal parts. It is lighter in weight, less expensive to manufacture and far more reliable in operation than those organizers utilizing zipper like construction. Zipper-containing organizers require two hands for actuation. They are susceptible to damage when exposed to water or perspiration (as would be the case when used in a marine environment or in a health club). When used in a moving vehicle, the driver may have to remove his hands from the wheel. Numerous other situations exist where use of two hands may occasion increased danger not only for the user, but for other vehicles and pedestrians in the nearby vicinity. Problems inherent in use of zip-up organizers and several of the organizers heretofore disclosed and utilized are virtually eliminated by the earpiece organizer, which is readily scrunched-up with one hand, making its usage much safer and considerably more conducive to today's active life style than prior art zipper containing devices. For example, a person running on a tread mill in a health club oftentimes hits the wire associated with the headphones he is wearing. This can cause the headphones to become dislodged and fall to the floor, disrupting the workout and possibly damaging the headphones as well as injuring the user. The earpiece organizer device is not as susceptible to this problem as it can be readily scrunched with one hand, to shorten or lengthen the wire with which the organizer is associated, thereby keeping the wire from swinging into contact with the runner's hands. Numerous other situations will come to mind wherein an active life style is complimented by the earpiece organizer to an extent not realized by prior art zipper containing organizers. The wire organizer may further include a separate carrying pouch that can attach to a mobile phone/music player.

Figure 5A:
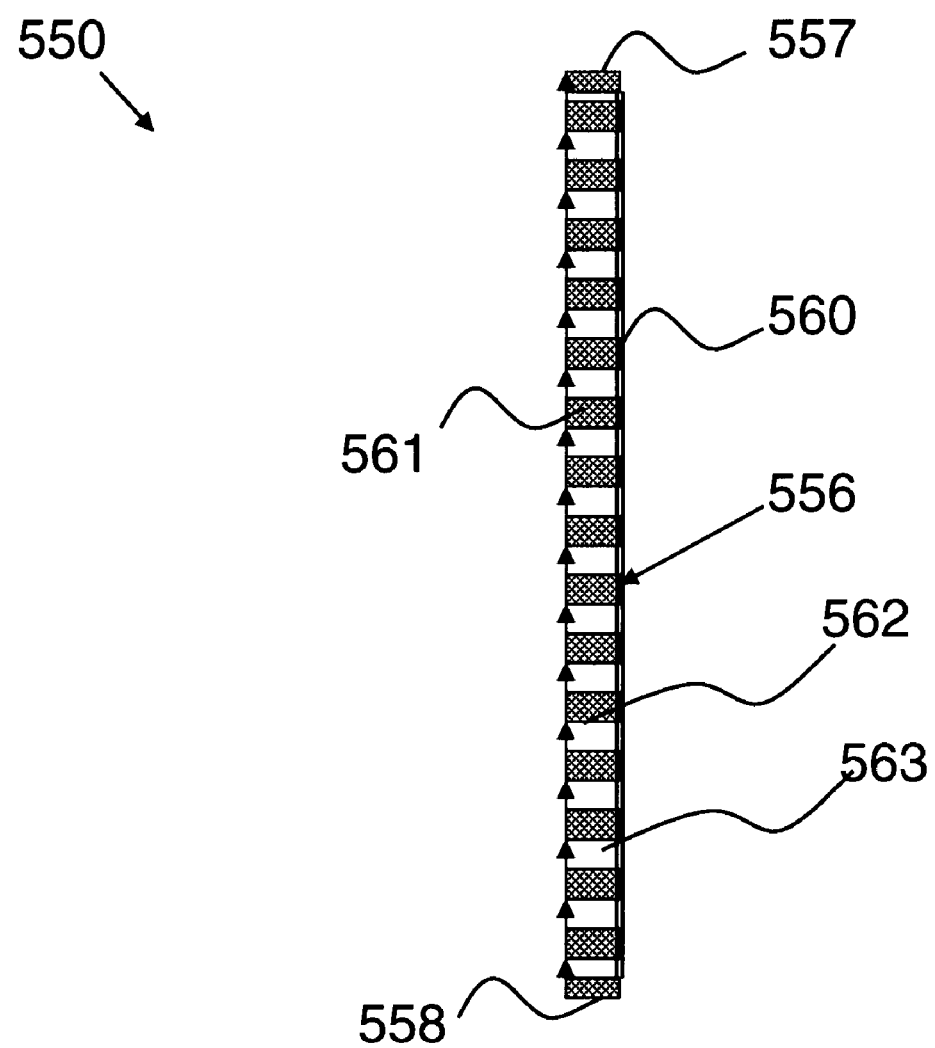
FIG. 5a illustrates an embodiment of the sleeve of the earpiece or wire organizer wherein the sleeve is an aftermarket item appointed to be placed on an existing earpiece.
Figure 5B:
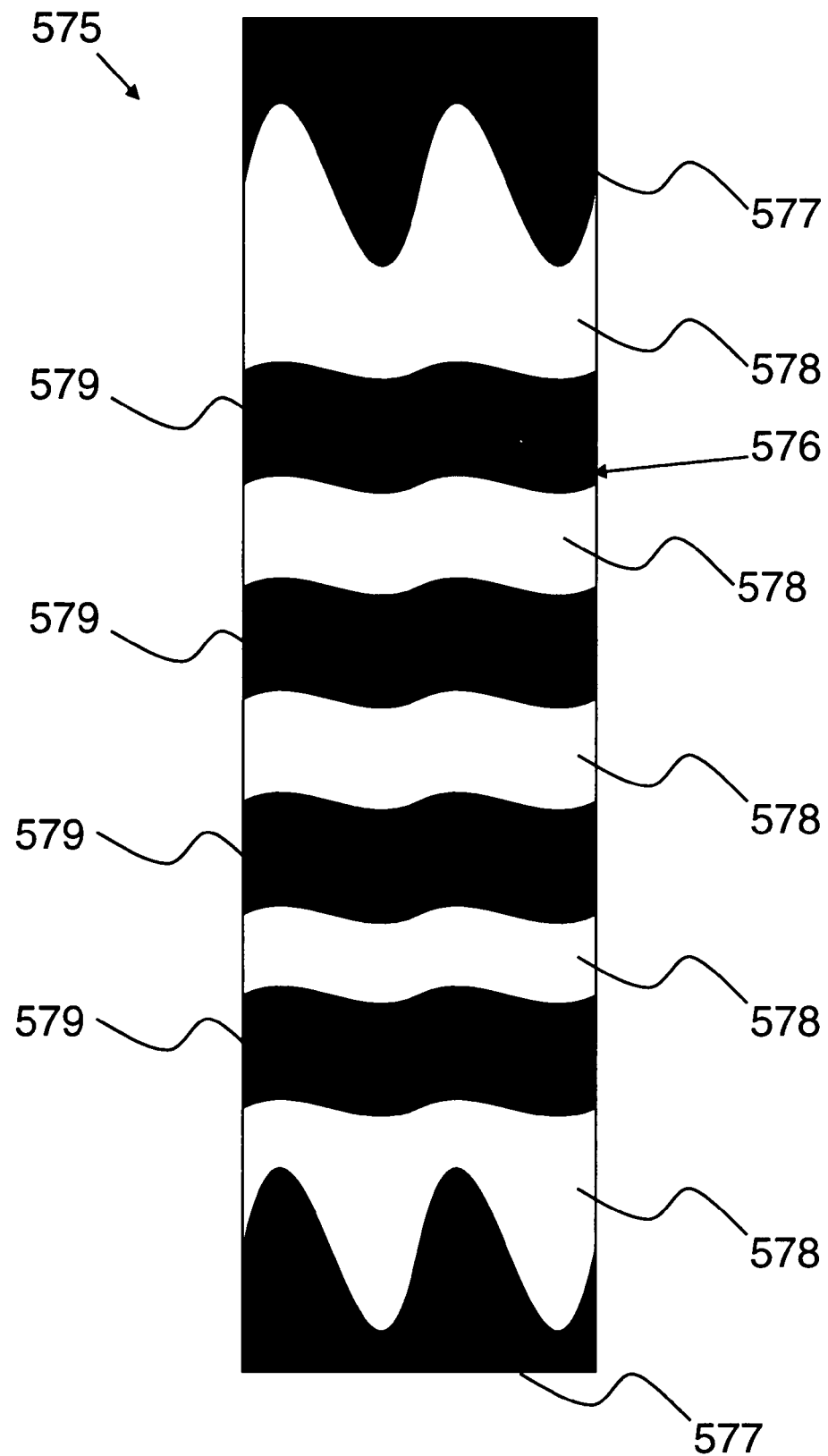
FIG. 5b illustrates another embodiment of the sleeve of the earpiece or wire organizer wherein the sleeve is an aftermarket item appointed to be placed on an existing earpiece.

FIGS. 5a and 5b illustrate schematic views of another embodiment of the earpiece/wire organizer, shown generally at 550 and 575, wherein the organizer is an aftermarket sleeve that can be applied to existing devices. Referring to FIG. 5a, sleeve 556 is provided to be attached to the wire of a headphone. Placement of sleeve 556 on the wire can be achieved by a number of methods. For example: sleeve 556 may include an elongated slit 560 for receiving the wire; sleeve 556 may be a coil like structure which is wrapped around the wire; or sleeve 556 may simply be slid over the wire. Sleeve 556 is comprised of a top/proximal end 557 and a bottom/distal end 558. Proximal end 557 and distal end 558 are appointed to be attached to the wire so that the wire is affixed to proximal end 557 and distal end 558. Sleeve 556 further comprises spine pieces 561 coated with an interlocking self-adhering surface 562 that is self adhering, preferably hook and loop construction (as self adhering Velcro®) that engages with itself and visa vie causes spine pieces 561 to attach to one another to compress and elongate the headphone wire. In FIG. 5a the spine pieces 561 of sleeve 556 are in the extended or elongated position with air gaps 563 therein. Spine pieces 561 may be in an accordion relation to one another, and/or otherwise abut one another so that there are not air gaps 563 between spine pieces 561.

Referring to FIG. 5b, a sleeve 576 is retrofit upon a wire 577 of headphones or earphones. The sleeve 576 is made up of a flexible rubber material that is cut like a spring or a coil. The sleeve 576 can twist onto any pre-existing wire 577. Mating spine pieces are shown at 578. These mating spine pieces 578 are coated with an interlocking self-adhering surface 562 that is self adhering, preferably hook and loop construction (as self adhering Velcro®). While open spaces in the twist or coil of the sleeve 576 are shown at 579 as gaps between spine pieces 578, the spine pieces 578 may abut up to one another so that there aren't gaps there between. For a single or unilateral wire 577 a coating of Velcro is applied so that the male and female spine pieces 578 alternate with a hook side and a loop side for mating engagement. For a double wire or Y-shaped headphone configuration, the male and female pieces 578 may be on separate sleeves 576 so that the sleeves engage.

Figure 6:
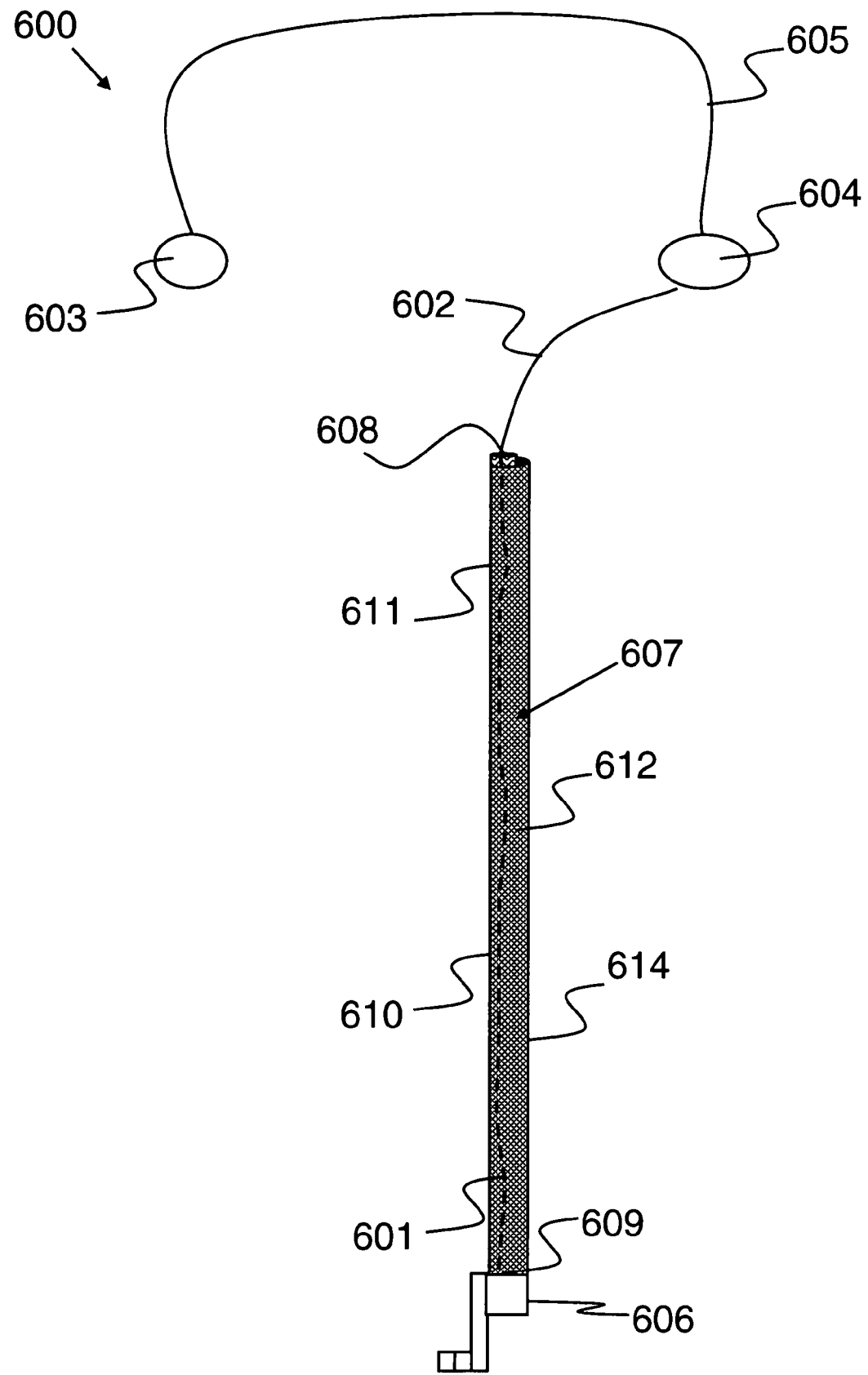
FIG. 6 illustrates an embodiment of the earpiece or wire organizer shown in a substantially elongated/lengthened/or extended form, wherein the organizer includes a first sleeve with first mating spine pieces generally housing a unilateral wire as utilized in earpieces for cellular phones or other electronic devices.

FIG. 6 illustrates an embodiment of the earpiece or wire organizer shown in a substantially elongated/lengthened/or extended form, wherein the organizer includes a first sleeve with first mating spine pieces coated with an interlocking self-adhering surface over the entire sleeve and generally housing a unilateral wire as utilized as earpieces for cellular phones or other electronic devices, shown generally at 600. Wire 601 is part of a headphone that is a unilateral type headphone set having a single unilateral audio wire 602 with ear buds 603, 604 connected by way of support wire 605. Audio wire 602 has an adaptor 606 appointed to engage with an electronic device by way of electronic device's headphone or audio jack. Wire organizer 600 includes at least one flexible first sleeve 607 having a proximal end 608, distal end 609, central body 610, and an interior cavity 611. First sleeve 607 may be manufactured as part of the wire 601 or may be an after market attachment to wire 601. Preferably, first sleeve 607 is constructed as an elongated cylinder structure. First mating spine pieces 612 are coated with an interlocking self-adhering surface 614 along substantially the entire body of first sleeve 607. The interlocking self-adhering surface 614 of first mating spine pieces 612 is appointed to self adhere in order to releasably engage with itself when sleeve 607 is coiled upon itself to neatly stow wire 601 housed therein.

Figure 7:
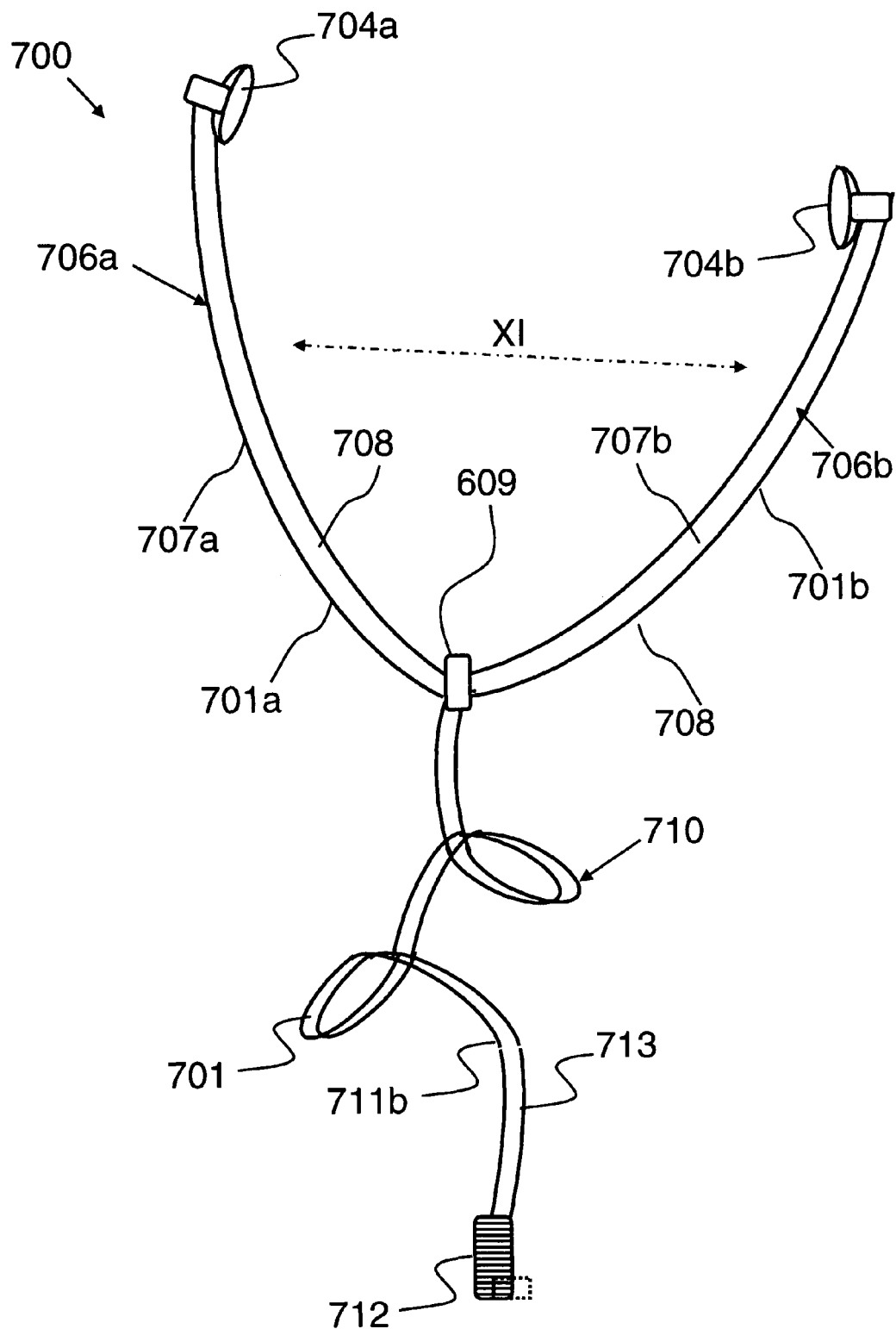
FIG. 7 illustrates an embodiment of the earpiece or wire organizer shown in a substantially elongated/lengthened/or extended form, wherein the organizer includes a first and second sleeve with first and second mating spine pieces generally housing headphone wires having a Y-shaped construction with dual audio wires attached to ear buds.

FIG. 7 illustrates an embodiment of the earpiece or wire organizer shown in a substantially elongated or extended form, wherein the organizer includes a first and second sleeve with interlocking self-adhering surface coated first and second mating spine pieces generally housing a headphone wires having a Y-shaped construction with dual audio wires attached to ear buds, shown at 700. In this embodiment, the headphone involves a Y-shaped construction with audio wires 701a and 701b attached to ear buds 704a and 704b, respectively. Audio wires 701a, 701b feed from main wire 701 at divider 709. Main wire 701 is attached to an adapter portion 712 appointed to be plugged-in to a jack of an electronic device. A first sleeve is shown at 706a for housing left wire 701a; a second sleeve 706b is provided for housing right wire 701b. First and second sleeves 706a, 706b each comprise oppositely arranged first and second mating spine pieces 707a, 707b coated with an interlocking self-adhering surface 708. The interlocking self-adhering surface 708 of first and second mating spine pieces 707a, 707b is appointed to self adhere in order to releasably engage with itself when sleeve 706a can be releasably attach to second sleeves 706b as shown by XI. Between divider 709 and adapter portion 712 a base sleeve 710 with alternating spine pieces 711 coated with interlocking self-adhering surface 713 may be provided so that this lower wire portion may coiled upon itself of attached to a patch or the like.

Figure 8A:
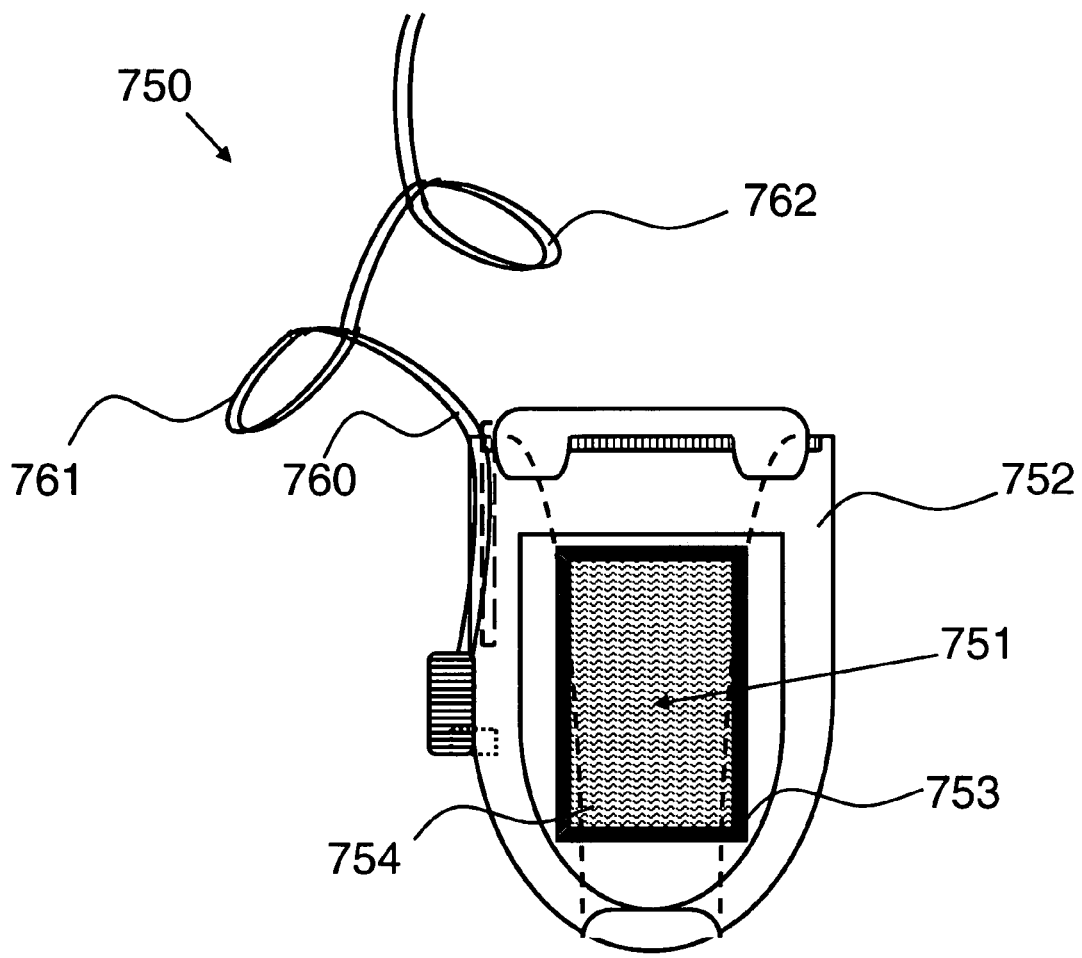
FIG. 8a illustrates a schematic view of an embodiment including a separate patch member with a patch back and a patch front, the patch back being attached to a cellular phone and the patch front having hook fasteners thereon for engaging with a sleeve of the wire organizer when the sleeve is not engaged with the patch front.
Figure 8B:
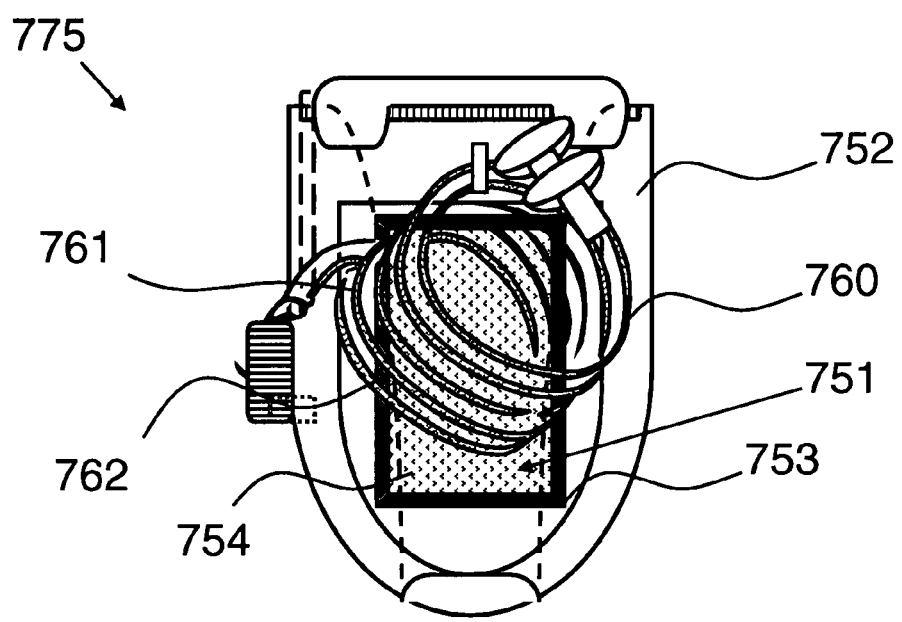
FIG. 8b illustrates a schematic view of the embodiment of FIG. 8a wherein the sleeve is engaged with the patch front.

FIGS. 8a and 8b illustrate schematic views of an embodiment including a separate patch member attached to a cellular phone, shown at 750 and 775, respectively. A patch 751 is attached to a cell phone 752. Patch 751 has a patch back 753 and a patch front 754. Patch front 754 is appointed to releasably attach to the interlocking coating 762 of spine pieces 761 making up sleeve 760 with a wire housed therein. Preferably, patch front 754 comprises a self adhering interlocking self-adhering surface composed of hook or eye fastening member appointed to releasably attach to the interlocking coating 762 of mating spine pieces 761. Patch back 753 is adhered to a surface of cellular phone 752 or to a mobile apparatus selected from a group consisting of a music or audio device, belt clip, belt buckle, arm band, or wrist band.

Figure 9:
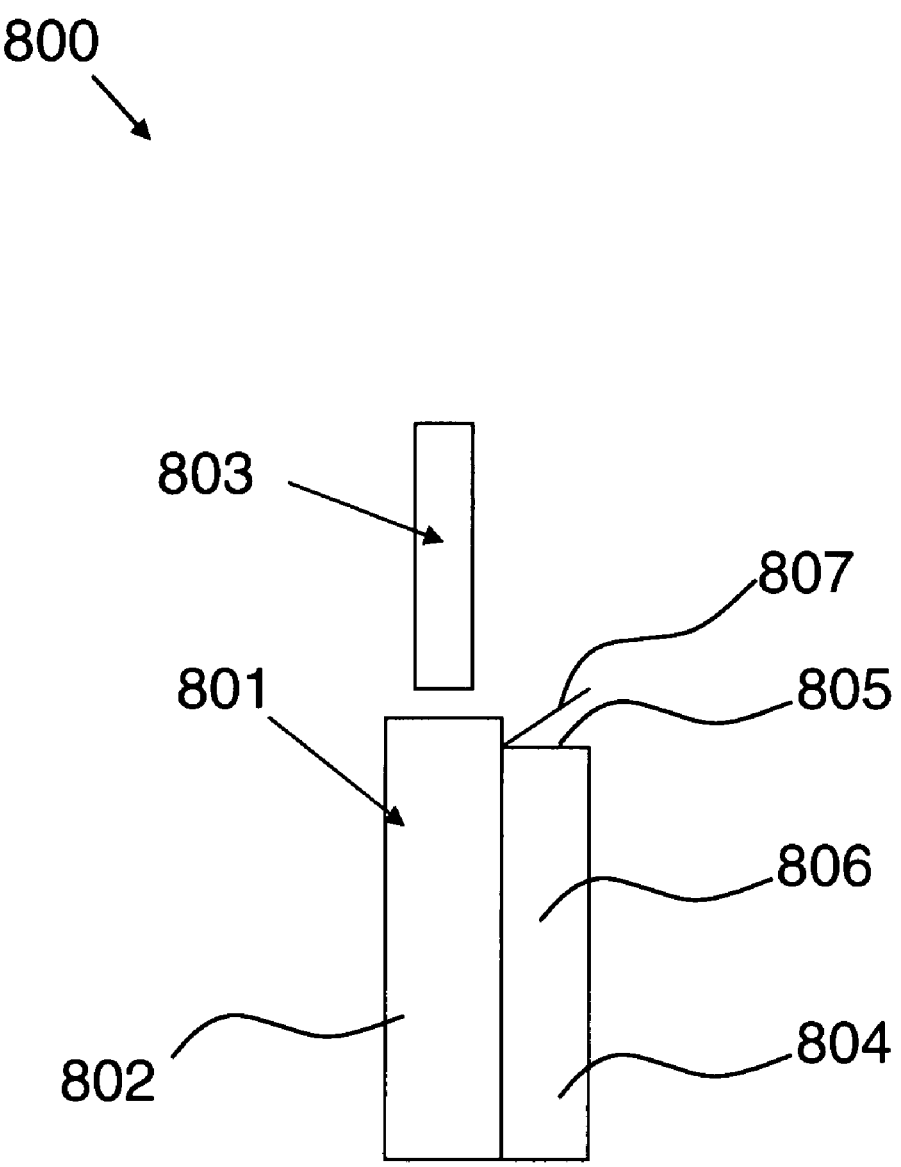
FIG. 9 illustrates a schematic view of an embodiment of a carrying case for the wire organizer.

FIG. 9 illustrates a schematic view of an embodiment of a carrying device case for the wire organizer, shown generally at 800. Device case 801 includes an audio device compartment 802 appointed to house an audio device 803, and a wire compartment 804 appointed to house the wire organizer/or other headphone wires. Wire compartment 804 is constructed as a pouch with an opening 805 and an internal cavity 806. Access to opening 805 is provided by flap 807, which may be used to securely close wire compartment 804 for storage of headphone/audio wires therein. Cases of all shapes, colors, sizes and materials can be utilized to attach the wire organizer to a device or cover. Arm bands and belt clips can be modified to hold the case and device; attachment can be achieved via clips and straps. The carrying device can be used for other styles of electronic add-ons that use or don't use the wire organizer. The carrying device could be used for laptops, mobile optical devices, portable MP players such as the PSP and hand held video games. The carrying case could be used for applications such as holding video games and movies for personal play stations or personal DVD players, laptops can use it for a portable mouse or web cam. The carrying device could be used to car keys and wallets. If cases and or covers can't be sued for the multitude of electronic devices, a strip of hook and eye fastener portions can be attached to a device using an adhesive side so that the device/case can be fastened to any mating surface.

Figure 10A:
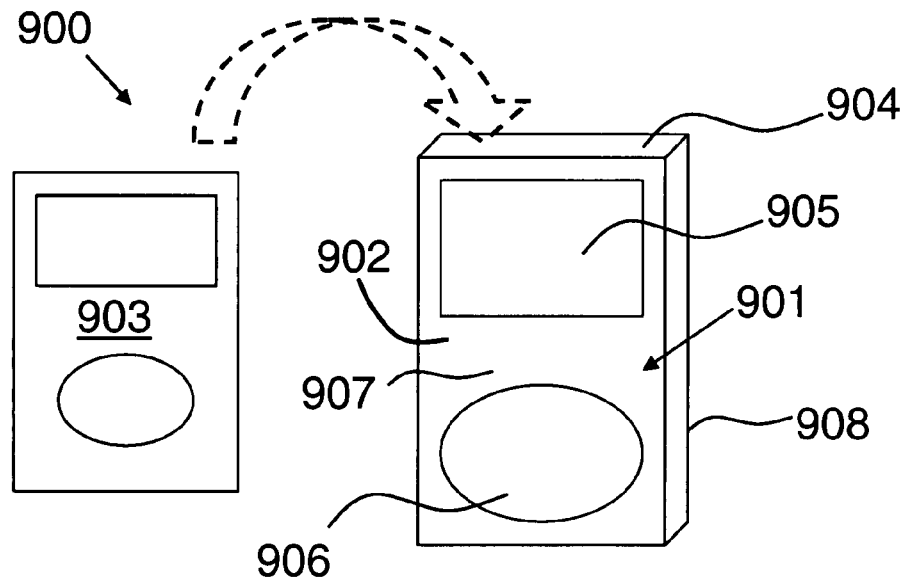
FIG. 10a illustrates a front view of an embodiment of a case for housing an audio device and accessories, such as the wire organizer.
Figure 10B:
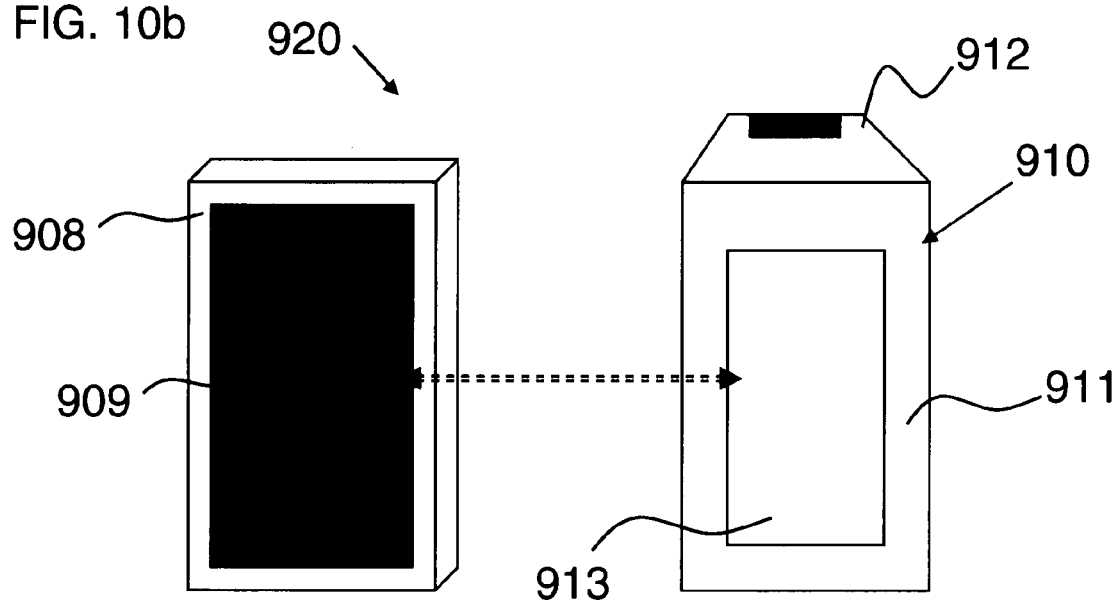

FIGS. 10a and 10b illustrate schematic views of an embodiment of a case for housing an audio device and the wire organizer, showing a front view generally at 900 in FIG. 10a, and showing a back view generally at 920 in FIG. 10b. A case 901 is provided, having a front 907 a back 908, and an interior cavity 902 appointed to receive an audio device 903 through insert slot 904. Case 901 is provided with screen cut-out/transparent screen 905 and button cut-out 906. On back 908 of case 901 a pad 909 is provided appointed with attachment means, such as hook or loop fasteners. An ear bud pouch 910 is provided. Ear bud pouch 910 comprises a bud cavity 911 for housing wires and ear buds, and has a flap closure 912 along with a pouch patch 913 including mating hook or loop fasteners appointed to releasably engage with pad 909 to releasably attach ear bud pouch 910 to back 908 of case 901.

Figure 11:
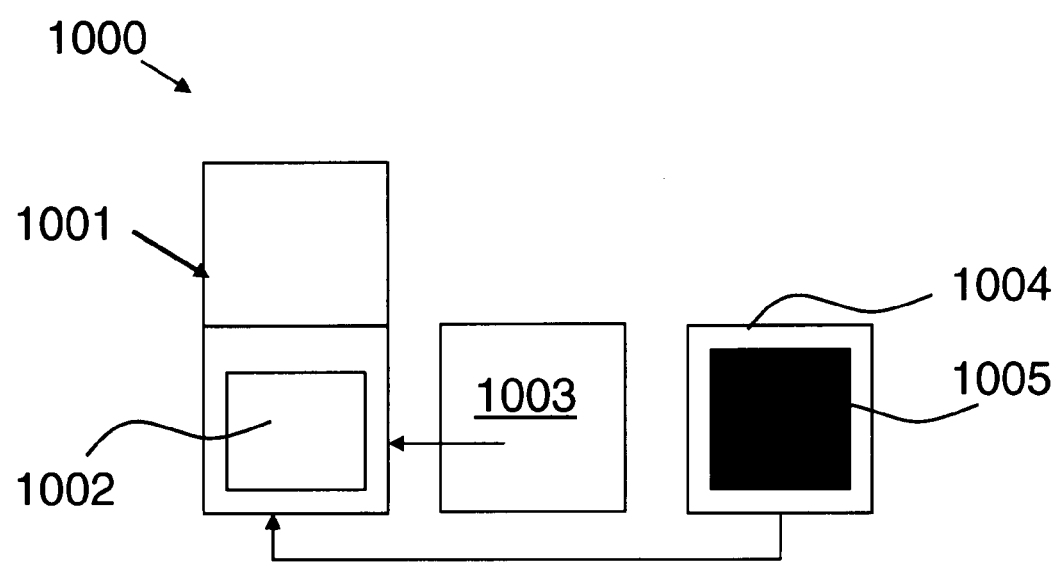
FIG. 11 illustrates an embodiment of a retrofit cover for carrying the wire organizer, or other accessories, on an audio device.

FIG. 11 illustrates a schematic view of an embodiment of a retrofit cover for carrying the wire organizer on an audio device, shown generally at 1000. An audio device 1001 is provided, such as a cellular phone or personal music player. Audio device 1001 includes a battery 1002 with an original battery cover 1003 appointed to be attached thereon. A retrofit battery cover 1004 is provided to replace original battery cover 1003. Retrofit battery cover 1004 includes an attachment pad 1005 thereon. Attachment pad 1005 comprises hook and loop fasteners and is appointed to releasably attach to the interlocking self-adhering surface of the sleeve of the wire organizer hereinabove described for carrying the organizer in a compact, secure manner. The wire organizer may be directly attached to the attachment pad 1005, or instead, a pouch with an interlocking pouch surface may be provided to house the wire organizer and that may be attached to interlocking pad 1005. The attachment pad 1005 can be a backing and or cover on the device itself, such as on the original battery cover. Arm bands and belt clips can be modified to hold the case and device using the opposite side of the attachment pad 1005, or for cases with retrofitted covers, attachment can be achieved via clips and straps. The pouches are not limited to a Velcro® attachment to the back of a case. The pouches could be part of a case or be fastened to the case using other methods such as zippers or buttons. The pouch could also have handles, straps, key chain attachments and the like.

Figure 12:
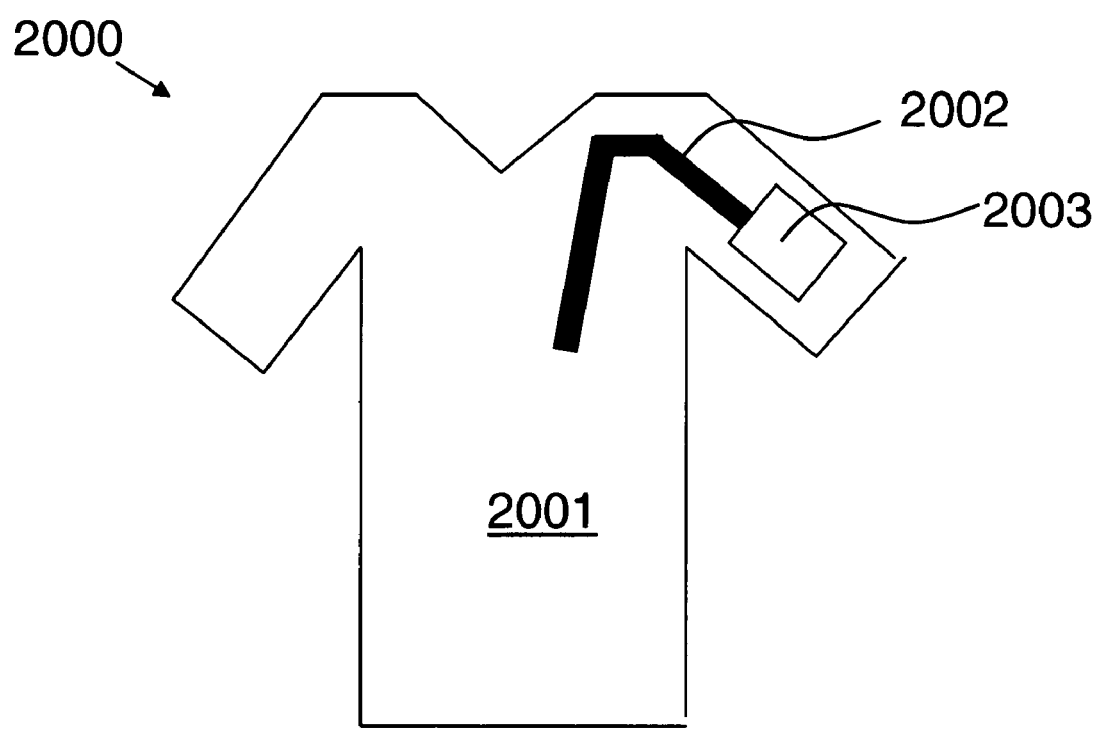
FIG. 12 shows a schematic view of an embodiment of a wire organizer management system.

FIG. 12 illustrates a schematic view of an embodiment of a wire organizer management system, shown generally at 2000. This wire organizer management system 2000 incorporates clothing, such as long and short sleeve shirts, jackets, pants, pull-over, or the like in carrying electronic devices and the wire organizer. Other things such as hats, gloves, scarf's, purses and more may be utilized. Herein, the clothing piece is shown as a short sleeved shirt 2001. A strip 2002 of Velcro® and a pocket 2003 is provided. Pocket 2003 is appointed to hold an electronic device, such as an MP3 player, I Pod®, MP4 player, CD player, cassette player, cell phone, or other electronic devices. Strip 2002 receives and carries the sleeve of the wire organizer thereon as the interlocking self-adhering surface of the sleeve adheres to strip 2002, thereby preventing slack from the ear bud wires from getting snagged or tangled during use. Although strip 2002 is shown as an elongated strip, strip 2002 may be a small patch or the like. Strip 2002 and/or pocket 2003 can be any color or shape or design, and can be an aftermarket application, or can be incorporated into the clothing/item and/or be infused within the material of the item.

Figure 13:
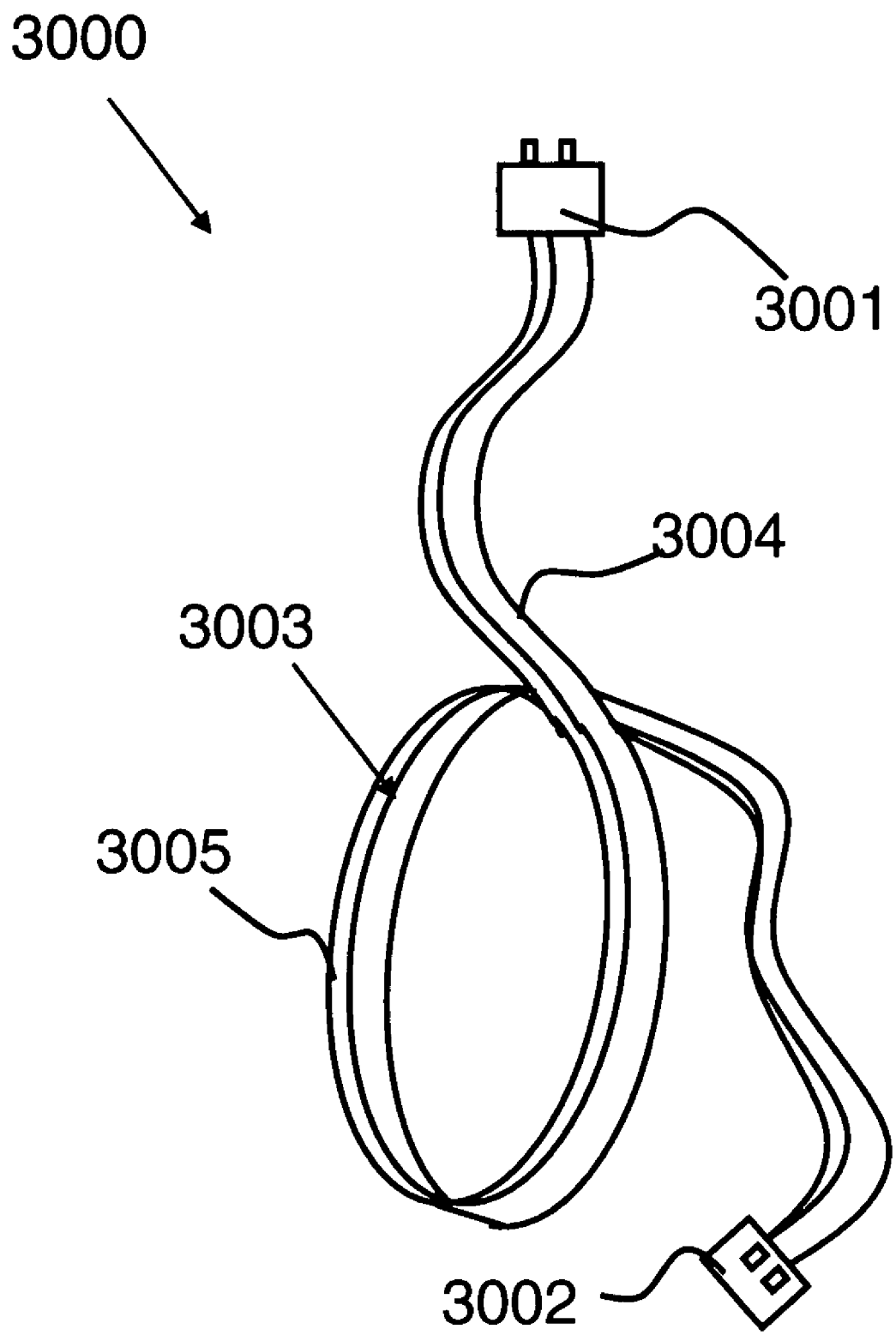
FIG. 13 shows an embodiment of the wire organizer wherein a first sleeve is provided on an electrical cord.

Other applications utilizing similar construction of the sleeves of the wire organizer include use in maintaining organization for electrical wires of various sorts. Such applications are illustrated in FIG. 13, Electrical cord is shown at 3000 with a sleeve 3003 thereon. Electrical cord 3000 includes a pronged portion 3001 and an outlet portion 3002. Sleeve 3003 includes mating spine pieces 3004 coated with a interlocking self-adhering surface 3005 generally including female and male portions, i.e. hook and loop portions, which releasably engage and disengage with one another when the locale interlocking self-adhering surface 3005 touches, such as when wire 3000 is coiled. Sleeve 3003 can be used for hoses or the like as well and can be attached to shrink wrap and sold by the foot for aftermarket application to the hose, electrical wire, or the like. As a result, the wires and hoses lay in a flat coiled condition when stored as the male and female portions engage or fasten to one another so that the wires/hoses are neatly maintained. Additionally, an engaging floor mat may be provided having a Velcro® mating surface so that when the electrical wire 3000 is extended and being used it will fasten or engage to the engaging floor mat. In this manner, the cord 3000 will be releasably adhered to the floor and tripping over such cords 3000 will be vastly avoid.

Construction of cord 3000 in accordance with the present invention provides the following advantageous: (i) less storage space needed; (ii) neat storage with orderly stacking ability; (iii) reduces the risk of accidents due to entanglement or tripping; and (iv) ultimately yields a longer cord life by preventing damage associated with knotting, entanglement, and trauma due to tripping. In application, the sleeve 3006 composed of a shrink wrap material is simply placed upon or wrapped on the body of the cord or hose and heat is applied (i.e. by a hairdryers or the like) so that the sleeve 3006 conforms to the shape of the cord or hose. These embodiments have particular applications in retro-fitting any hose or wire as an aftermarket sleeve with the appointed fastening means is provided.

The embodiments may further be used in conjunction with a universal winder as is shown in FIG. 14 generally at 9000. Winder 9000 includes a winder body having a handle 9001 with a universal plug outlet adapter 9002 and universal adapter slot 9003 constructed therein. The body of winder 9000 has a top 9004 with a hole 9008 to accommodate a wire or hose end, and a bottom 9005 connected by way of a cylinder 9009, which is in turn connected to handle 9001. A slide 9006 and a connector 9007 are provided in bottom 9005 of winder 9000. Connector 9007 is appointed to force male and female portions together during winding of the wire or cord.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A wire organizer, comprising:
   a. at least one flexible sleeve having a proximal end, distal end, central body, and an interior cavity, said sleeve being adapted to receive and house a substantial portion of a wire within said interior cavity;
   b. a plurality of mating spine pieces located on said flexible sleeve coated with an interlocking self-adhering surface releasably engaging said spine pieces together at any orientation so that said spine pieces are appointed to releasably engage with one another to decrease the distance between said proximal and distal ends to compress said flexible sleeve and conversely, when released, to increase the distance between said proximal and distal ends to elongate said sleeve and said wire housed therein;
   c. said wire organizer is devoid of a zipper, zipper hooks or a zipper slider;
   d. said wire is part of an audio wire constructed for electronic devices, including headphones, earpieces, and headsets;
   e. said sleeve is constructed as an elongated cylinder structure; and
   f. said sleeve is interstitially constructed within said wire during a manufacturing process; whereby scrunching or compressing said sleeve engages said mating spine pieces to compress said wire housed therein when said wire is in non-use or shorter wire length is desired; and pulling on said sleeve disengages said mating spine pieces to lengthen said wire housed therein when said wire is in use or a longer wire length is desired.

2. A wire organizer as recited by claim 1, wherein said sleeve comprises a slit for inserting said wire into said sleeve so that said wire is removably housed therein.

3. A wire organizer as recited by claim 2, wherein said proximal end of said sleeve includes an upper attachment means appointed to be attached to a top portion of said wire housed within said sleeve, and wherein said distal end of said sleeve includes a lower wire attachment means appointed to be attached to a bottom portion of said wire housed within said sleeve so that said substantial portion of said wire is housed within said sleeve and is compressed and elongated when said spine pieces of said sleeve are compressed and elongated.

4. A wire organizer as recited by claim 1, wherein said spine pieces are connected to one another by way of a flexible spine member running lengthwise along said sleeve.

5. A wire organizer as recited by claim 1, wherein said interlocking self-adhering surface coated on each of said mating spine pieces comprises hook and eye fastener portions so that said interlocking self-adhering surface attaches to itself.

6. A wire organizer as recited by claim 1 comprising a separate patch member with a patch back and a patch front, said patch front being appointed to releasably attach to said sleeve with said wire housed therein.

7. A wire organizer as recited by claim 6, wherein said patch front of said patch member comprises a hook or eye fastening surface appointed to releasably attach to said plurality of mating spine pieces wherein said spine pieces have alternating hook and eye surfaces.

8. A wire organizer as recited by claim 6, wherein said patch back is adhered to a surface of a cellular phone.

9. A wire organizer as recited by claim 6, wherein said patch back is adhered to a surface of a mobile apparatus selected from a group consisting of a music or audio device, belt clip, belt buckle, arm band, or wrist band.

10. A wire organizer as recited by claim 1, wherein at least two of said sleeves are provided for housing a left and right wire of a headset having dual ear bud wires to form a left sleeve and a right sleeve.

11. A wire organizer as recited by claim 10, wherein said interlocking self-adhering surface coated on each of said left and right sleeves comprises hook and eye fastener portions so that said interlocking self-adhering surface attaches to itself and allows each of said left and right sleeves to be compressed and elongated, and said left and right sleeve to be releasably attachable to one another.

12. A wire organizer as recited by claim 1 comprising a carrying pouch for housing said sleeve therein.

13. A wire organizer, comprising:
  a. a first sleeve constructed as an elongated cylinder structure that is adapted to receive and house a first wire, where said first wire is interstitially constructed within said first sleeve during a manufacturing process;
  b. first mating spine pieces located on said flexible sleeve coated with an interlocking self-adhering surface located on said first sleeve, said interlocking self-adhering surface releasably engaging said spine pieces together at any orientation;
  c. said wire organizer is devoid of a zipper, zipper hooks or a zipper slider; and
  d. said interlocking self-adhering surface coated on each of said first mating spine pieces of said first sleeve is appointed to releasably engage and attach to itself to decrease the distance between said proximal and distal ends to compress said flexible sleeve when said first sleeve is coiled upon itself.

14. A wire organizer as recited by claim 13, wherein said first wire is an integral part of a cord, wherein said wire and visa vie said cord is housed within said first sleeve, wherein said interlocking self-adhering surface coated on each of said first mating spine pieces of said first sleeve releasably engages with itself when said sleeve with said cord therein is coiled upon itself.

15. A wire organizer as recited by claim 13 further comprising a winder for winding said first sleeve and coiling same upon itself.

16. A wire organizer as recited by claim 13 comprising a second sleeve adapted to receive and house a second wire, wherein said second sleeve comprises second mating spine pieces coated with said interlocking self-adhering surface and being appointed to engage with said interlocking self-adhering surface coated on said first mating spine pieces to releasably attach said first and second sleeves together; said second sleeve is constructed as an elongated cylinder structure, and where said second wire is interstitially constructed within said second sleeve during a manufacturing process.

17. A wire organizer as recited by claim 16, wherein said interlocking self-adhering surface coated on each of said first and second mating spine pieces located on said first and second sleeves, respectively, comprises hook and eye fastener portions so that said interlocking self-adhering surface attaches to itself and engage with on another to releasably join said first and second sleeves.

18. A wire organizer as recited by claim 13 comprising a separate patch member having a patch back and a patch front, said patch front being appointed to releasably attach to said first sleeve.

19. A wire organizer as recited by claim 18, wherein said patch back is adhered to a surface of a cellular phone.

20. A wire organizer as recited by claim 18, wherein said patch back is adhered to a surface of a mobile apparatus selected from a group consisting of a music or audio device, belt clip, belt buckle, arm band, or wrist band.

21. A wire organizer as recited by claim 13, wherein said wire is an audio wire, such as for headphones, earpieces, headsets, or like devices.

* * * * *